United States Patent
Kim et al.

(10) Patent No.: US 10,492,210 B2
(45) Date of Patent: Nov. 26, 2019

(54) METHOD FOR REPORTING CHANNEL STATE INFORMATION IN WIRELESS ACCESS SYSTEM SUPPORTING UNLICENSED BANDS, AND APPARATUS SUPPORTING SAME

(71) Applicant: LG ELECTRONICS INC., Seoul (KR)

(72) Inventors: Seonwook Kim, Seoul (KR); Joonkui Ahn, Seoul (KR); Seungmin Lee, Seoul (KR); Kijun Kim, Seoul (KR); Suckchel Yang, Seoul (KR); Hanbyul Seo, Seoul (KR); Jonghyun Park, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/529,736

(22) PCT Filed: Dec. 23, 2015

(86) PCT No.: PCT/KR2015/014196
§ 371 (c)(1),
(2) Date: May 25, 2017

(87) PCT Pub. No.: WO2016/105132
PCT Pub. Date: Jun. 30, 2011

(65) Prior Publication Data
US 2017/0367106 A1 Dec. 21, 2017

Related U.S. Application Data

(60) Provisional application No. 62/095,781, filed on Dec. 23, 2014, provisional application No. 62/105,756,
(Continued)

(51) Int. Cl.
*H04B 7/06* (2006.01)
*H04W 72/12* (2009.01)
(Continued)

(52) U.S. Cl.
CPC ...... *H04W 72/1215* (2013.01); *H04B 7/0626* (2013.01); *H04L 5/001* (2013.01);
(Continued)

(58) Field of Classification Search
CPC ..... H04W 16/26; H04B 7/0626; H04L 1/0693
See application file for complete search history.

(56) References Cited

U.S. PATENT DOCUMENTS

| 9,839,049 B2 | 12/2017 | Bashar et al. |
| 10,306,662 B2 | 5/2019 | Kim et al. |

(Continued)

FOREIGN PATENT DOCUMENTS

| CN | 101958772 A | 1/2011 |
| CN | 102118189 A | 7/2011 |

(Continued)

OTHER PUBLICATIONS

Catt et al., "Correction on TDD-FDD CA with TDD PCell," R1-144607, 3GPP TSG RAN WG1 Meeting #79, San Francisco, USA, Nov. 17-21, 2014 (retrieved on Nov. 8, 2014), 4 pages.
(Continued)

*Primary Examiner* — Salvador E Rivas
(74) *Attorney, Agent, or Firm* — Birch, Stewart, Kolasch & Birch, LLP

(57) ABSTRACT

The present invention relates to a wireless access system that supports unlicensed bands, and relates to a method for reporting channel state information when a partial subframe (pSF) is formed. A method for user equipment (UE) reporting channel state information (CSI) in a wireless access system that supports unlicensed bands according to an
(Continued)

embodiment of the present invention may comprise the steps of: receiving a downlink burst configured to an unlicensed band cell (U cell) supporting unlicensed bands as far as a certain subframe; measuring CSI with respect to the downlink burst; and reporting the measured CSI to a base station. In this regard, if a pSF is included in the downlink burst, the UE does not consider the pSF to be a valid downlink subframe for CSI measurement, and the pSF may be formed to have a smaller size than a general subframe.

12 Claims, 22 Drawing Sheets

Related U.S. Application Data filed on Jan. 21, 2015, provisional application No. 62/136,366, filed on Mar. 20, 2015, provisional application No. 62/138,358, filed on Mar. 25, 2015, provisional application No. 62/142,453, filed on Apr. 2, 2015, provisional application No. 62/151,361, filed on Apr. 22, 2015, provisional application No. 62/161,210, filed on May 13, 2015, provisional application No. 62/165,159, filed on May 21, 2015, provisional application No. 62/207,898, filed on Aug. 20, 2015, provisional application No. 62/207,944, filed on Aug. 21, 2015, provisional application No. 62/222,179, filed on Sep. 22, 2015, provisional application No. 62/236,147, filed on Oct. 2, 2015, provisional application No. 62/249,905, filed on Nov. 2, 2015.

(51) Int. Cl.

| | |
|---|---|
| H04W 72/04 | (2009.01) |
| H04L 5/00 | (2006.01) |
| H04W 24/10 | (2009.01) |
| H04W 16/14 | (2009.01) |
| H04L 27/26 | (2006.01) |
| H04W 74/08 | (2009.01) |

(52) U.S. Cl.
CPC .......... *H04L 5/0007* (2013.01); *H04L 5/0048* (2013.01); *H04L 5/0053* (2013.01); *H04L 5/0094* (2013.01); *H04W 16/14* (2013.01); *H04W 24/10* (2013.01); *H04W 72/04* (2013.01); *H04W 72/042* (2013.01); *H04W 72/0446* (2013.01); *H04W 72/12* (2013.01); *H04L 5/0055* (2013.01); *H04L 5/0092* (2013.01); *H04L 27/2601* (2013.01); *H04W 72/1205* (2013.01); *H04W 74/0808* (2013.01)

(56) References Cited

U.S. PATENT DOCUMENTS

| | | |
|---|---|---|
| 2012/0264441 A1 | 10/2012 | Chandrasekhar et al. |
| 2012/0307744 A1 | 12/2012 | Charbit et al. |
| 2013/0039284 A1 | 2/2013 | Marinier et al. |
| 2013/0094456 A1 | 4/2013 | Ng |
| 2013/0163543 A1 | 6/2013 | Freda et al. |
| 2013/0194931 A1 | 8/2013 | Lee et al. |
| 2013/0329711 A1 | 12/2013 | Seo et al. |
| 2014/0036853 A1 | 2/2014 | Kim et al. |
| 2014/0064237 A1 | 3/2014 | Lee et al. |
| 2014/0071931 A1 | 3/2014 | Lee et al. |
| 2014/0112289 A1 | 4/2014 | Kim et al. |
| 2014/0119253 A1 | 5/2014 | Weng et al. |
| 2014/0301287 A1 | 10/2014 | Frenne et al. |
| 2015/0085718 A1* | 3/2015 | Chen ............... H04B 7/2656 370/280 |
| 2015/0208392 A1 | 7/2015 | Park et al. |
| 2015/0223075 A1 | 8/2015 | Bashar et al. |
| 2016/0036581 A1* | 2/2016 | Yerramalli ............... H04L 5/14 370/280 |
| 2016/0095114 A1 | 3/2016 | Kim et al. |
| 2017/0094528 A1* | 3/2017 | Takeda ................ H04W 16/14 |
| 2017/0311206 A1* | 10/2017 | Ryoo ................... H04W 24/08 |
| 2017/0311322 A1 | 10/2017 | Kim et al. |

FOREIGN PATENT DOCUMENTS

| | | |
|---|---|---|
| CN | 102484552 A | 5/2012 |
| CN | 103270714 A | 8/2013 |
| CN | 103828396 A | 5/2014 |
| CN | 104113397 A | 10/2014 |
| JP | 2013-524555 A | 6/2013 |
| JP | 2014-508471 A | 4/2014 |
| JP | 2019-4194 A | 1/2019 |
| KR | 10-2011-0061507 A | 6/2011 |
| KR | 10-2014-0010385 A | 1/2014 |
| KR | 10-2014-0031203 A | 3/2014 |
| WO | WO 2013/006006 A2 | 1/2013 |
| WO | WO 2013/165167 A1 | 10/2013 |
| WO | WO 2014/073776 A1 | 5/2014 |

OTHER PUBLICATIONS

CMCC, "Discussion on possible solutions for LAA," R1-144940, 3GPP TSG-RAN WG1 #79, San Francisco, USA, Nov. 17-21, 2014 (retrieved on Nov. 8, 2014), pp. 1-6.
Fujitsu, "DL data and CRS transmission for LAA," R1-144785, 3GPP TSG RAN WG1 Meeting #79, San Francisco, USA, Nov. 17-21, 2014 (retrieved on Nov. 8, 2014), pp. 1-8.
Fujitsu, "Way Forward on CSI reporting for CA," R1-111940, 3GPP TSG-RAN1#65, Barcelona, Spain, May 9-13, 2011, 10 pages.
LG Electronics, "CSI feedback and handling interference variation in unlicensed band," R1-144902, 3GPP TSG RAN WG1 Meeting #79, San Francisco, USA, Nov. 17-21, 2014 (retrieved on Nov. 8, 2014), 5 pages.
LG Electronics, "Data scheduling and control signaling in LAA," R1-144904, 3GPP TSG RAN WG1 Meeting #79, San Francisco, USA, Nov. 17-21, 2014 (retrieved on Nov. 8, 2014), 5 pages.
Panasonic, "Discussion on LAA subframe boundary alignment," R1-144802, 3GPP TSG RAN WG1 Meeting #79, San Francisco, USA, Nov. 17-21, 2014 (retrieved on Nov. 8, 2014), pp. 1-4.
Alcatel-Lucent et al, "DCI Transmission for the DL Partial Subframe in LAA," R1-151483, 3GPP TSG RAN WG1 Meeting #80bis, Belgrade, Serbia, Apr. 20-24, 2015, pp. 1-2.
Alcatel-Lucent Shanghai Bell et al, "LBT Enhancements for Licensed-Assisted Access," R1-144701, 3GPP TSG RAN WG1 Meeting #79, San Francisco, USA, Nov. 17-21, 2014, pp. 1-5.
Alcatel-Lucent Shanghai Bell et al, "Support of Initial Partial Subframe in LAA," R1-157016, 3GPP TSG RAN WG1 Meeting #83, Anaheim, USA, Nov. 15-22, 2015, pp. 1-6.
MediaTek Inc., "Considerations on CSI Feedback in LAA," R1-151939, 3GPP TSG RAN WG1 Meeting #80bis, Belgrade, Serbia, Apr. 20-24, 2015, pp. 1-5.
Nokia Networks, "On Data Transmission in Partial Subframe for LBE Type of Operation," R1-152019, 3GPP TSG-RAN WG1 Meeting #80bis, Belgrade, Serbia, Apr. 20-24, 2015, pp. 1-6.
Qualcomm et al, "WF on LAA Data burst Structure," R1-152384, 3GPP TSG-RAN WG1 Meeting #80Bis, Belgrade, Serbia, Apr. 20-24, 2015, 4 pages.
3rd Generation Partnership Project, "Technical Specification Group Radio Access Network; Evolved Universal Terrestrial Radio Access (E-UTRA); Physical Channels and Modulation (Release 12)," 3GPP TS 36.211, V12,3.0, Sep. 2014, pp. 1-124.
3rd Generation Partnership Project, "Technical Specification Group Radio Access Network; Evolved Universal Terrestrial Radio Access (E-UTRA); Physical Layer Procedures (Release 12)," 3GPP TS 36.213, V12.3.0, Sep. 2014, pp. 1-212.
Catt, "Listen Before Talk for LAA," 3GPP TSG RAN WG1 Meeting #79, R1-144625, San Francisco, USA, Nov. 17-21, 2014, 6 pages.

(56) References Cited

OTHER PUBLICATIONS

Huawei et al., "Discontinuous transmission and partial subframe design for LAA," 3GPP TSG RAN WG1 Meeting #81, R1-152471, Fukuoka, Japan, May 25-29, 2015, 5 pages.

* cited by examiner

FIG. 9
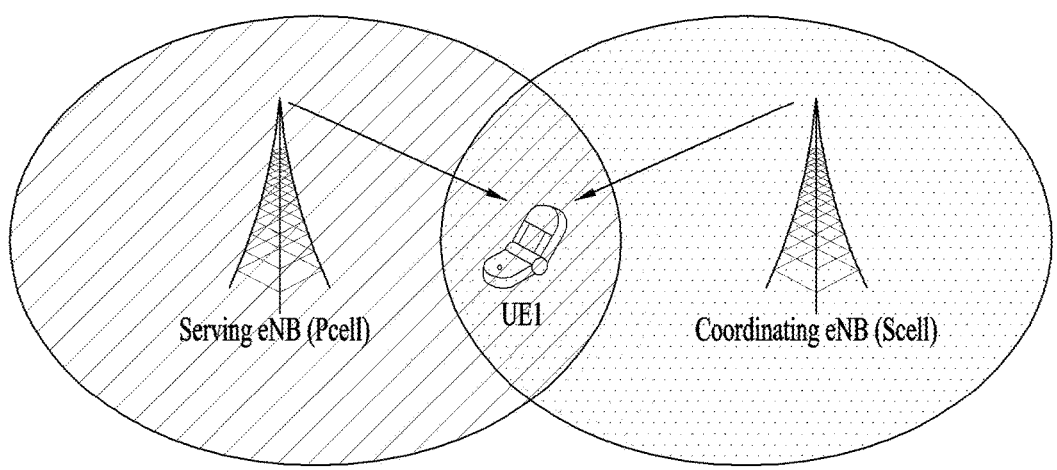
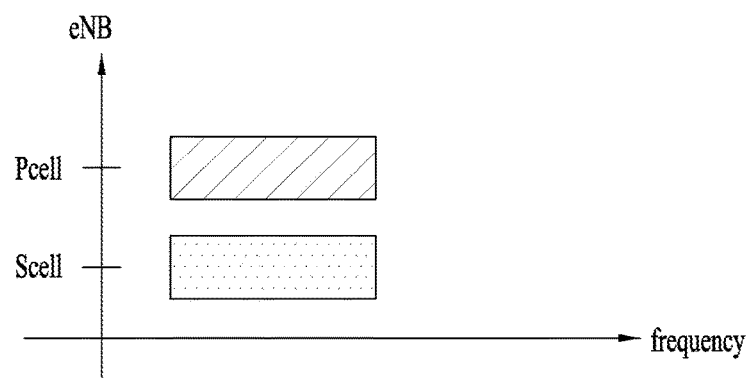

FIG. 24
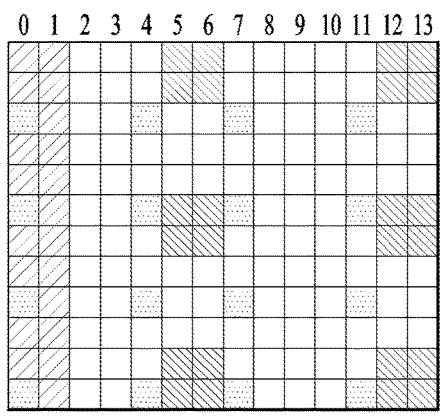
(a) Full SF
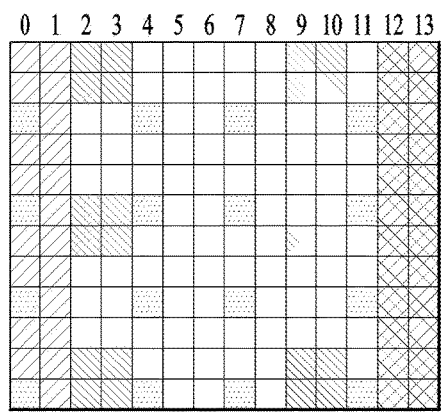
(b) DwPTS length : {11, 12}
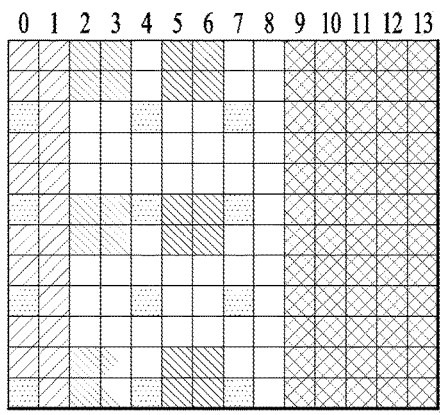
(c) DwPTS length : {9, 10}
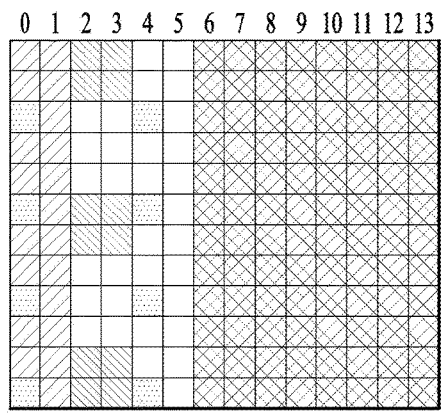
(d) DwPTS length : {6}

METHOD FOR REPORTING CHANNEL STATE INFORMATION IN WIRELESS ACCESS SYSTEM SUPPORTING UNLICENSED BANDS, AND APPARATUS SUPPORTING SAME

CROSS REFERENCE TO RELATED APPLICATIONS

This application is the National Phase of PCT International Application No. PCT/KR2015/014196 filed on Dec. 23, 2015, which claims priority under 35 U.S.C. 119(e) to U.S. Provisional Application No. 62/095,781 filed on Dec. 23, 2014, No. 62/105,756 filed on Jan. 21, 2015, No. 62/136,366 filed on Mar. 20, 2015, No. 62/138,358 filed on Mar. 25, 2015, No. 62/142,453 filed on Apr. 2, 2015, No. 62/151,361 filed on Apr. 22, 2015, No. 62/161,210 filed on May 13, 2015, No. 62/165,159 filed on May 21, 2015, No. 62/207,898 filed on Aug. 20, 2015, No. 62/207,944 filed on Aug. 21, 2015, No. 62/222,179 filed on Sep. 22, 2015, No. 62/236,147 filed on Oct. 2, 2015, No. 62/249,905 filed on Nov. 2, 2015, all of which are hereby expressly incorporated by reference into the present application.

TECHNICAL FIELD

The present disclosure relates to a wireless access system supporting an unlicensed band, and to methods for configuring and scheduling a partial Subframe (pSF), and apparatuses supporting the same. More particularly, the present disclosure relates to a method for channel state information, when the pSF is configured.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present disclosure is to provide a method for configuring a partial Subframe (pSF) defined in an unlicensed band in a wireless access system supporting an unlicensed band.

Another object of the present disclosure is to provide, when a pSF is configured, various methods for scheduling the pSF. For example, a cross-carrier scheduling method, a self-carrier scheduling method, and a hybrid scheduling method are provided.

Another object of the present disclosure is to provide a method for operating a Base Station (BS) and a User Equipment (UE) to manage a pSF.

Another object of the present disclosure is to provide a method for restricting a scheduling scheme, when cross-carrier scheduling is applied.

Another object of the present disclosure is to provide a method for indexing Enhanced Resource Element Groups (EREGs), when self-carrier scheduling is performed using an Enhanced Physical Downlink Control Channel (EPDCCH) in an Unlicensed Cell (UCell).

Another object of the present disclosure is to provide, when self-carrier scheduling is applied, a method for configuring and transmitting an EPDCCH in a UCell and a method for decoding the EPDCCH.

Another object of the present disclosure is to provide a Demodulation Reference Signal (DM-RS) pattern allocated to a pSF.

Another object of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting an unlicensed band, and to methods for configuring and scheduling a partial Subframe (pSF), and apparatuses supporting the same. More particularly, the present disclosure relates to a method for channel state information, when a pSF is configured.

In an aspect of the present disclosure, a method for reporting channel state information (CSI) by a user equipment (UE) in a wireless access system supporting an unlicensed band may include receiving a predetermined number of subframes of a downlink burst configured in an unlicensed band cell (UCell) supporting the unlicensed band, measuring CSI for the downlink burst, and reporting the measured CSI to a base station (BS). If the downlink burst includes a partial subframe (pSF), the UE may not consider the pSF to be a valid downlink subframe for the CSI measurement, and the pSF may be configured in a size smaller than a general subframe.

In another aspect of the present disclosure, a UE for reporting CSI in a wireless access system supporting an unlicensed band may include a receiver, a transmitter, and a processor configured to support CSI measurement. The processor may be configured to receive a predetermined number of subframes of a downlink burst configured in an unlicensed band cell (UCell) supporting the unlicensed band by controlling the receiver, to measure CSI for the downlink burst, and to report the measured CSI to a base station (BS) by controlling the transmitter. If the downlink burst includes a partial subframe (pSF), the processor may not consider the pSF to be a valid downlink subframe for the CSI measurement, and the pSF may be configured in a size smaller than a general subframe.

The pSF may be scheduled by self-carrier scheduling, and a general subframe included in the downlink burst may be scheduled by cross-carrier scheduling.

When the BS requests CSI reporting in a primacy cell (PCell) configured in a licensed band, the CSI reporting may be performed, and the measured CSI may be reported in the PCell.

When the BS requests CSI reporting in the UCell, the CSI reporting may be performed, and the measured CSI may be reported in the UCell.

The CSI reporting may be performed periodically in a PCell configured in a licensed band.

If the pSF is not considered to be a valid subframe, a reference resource for CSI measurement may not be allocated to the pSF, and the UE may measure CSI only in a normal subframe included in the downlink burst during the CSI measurement.

The above-described aspects of the present disclosure are merely some parts of the embodiments of the present disclosure and various embodiments into which the technical features of the present disclosure are incorporated may be derived and understood by persons skilled in the art from the following detailed description of the present disclosure.

Advantageous Effects

Embodiments of the present disclosure have the following effects.

First, since various scheduling schemes such as cross-carrier scheduling, self-carrier scheduling, and hybrid scheduling are provided, radio resources can be scheduled adaptively for a License Assisted Access (LAA) User Equipment (UE).

Secondly, resource waste that may occur in an LAA Unlicensed cell (UCell) can be prevented by providing a method for operating a Base Station (BS) and a UE, for partial Subframe (pSF) management.

Thirdly, when cross-carrier scheduling is applied, a scheduling scheme applied to a UE in a pSF is restricted. Therefore, waste of control resources such as a Physical Downlink Control Channel (PDCCH) can be prevented.

Fourthly, when self-carrier scheduling is applied, a method for configuring and transmitting an Enhanced PDCCH (EPDCCH) in a UCell and a method for decoding the EPDCCH can be provided. Because a pSF is not a normal SF, a legacy resource allocation scheme is not viable. Particularly in order to transmit an EPDCCH, the legacy resource allocation scheme should be complemented. In the present disclosure, therefore, Resource Elements (REs) of resources in which a pSF is configured is labeled with new Enhanced Resource Element Group (EREG) indexes, the number of EREGs is fixed to a predetermined value, and an EREG aggregation level is increased, thereby enabling efficient, stable mapping of an EPDCCH.

Fifthly, since a Demodulation Reference Signal (DM-RS) pattern allocated to a pSF is provided, a UE also performs channel estimation in the pSF. Consequently, data decoding performance can be increased.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. That is, those skilled in the art can derive unintended effects resulting from implementation of the present disclosure from the embodiments of the present disclosure.

BRIEF DESCRIPTION OF THE DRAWINGS

The accompanying drawings, which are included to provide a further understanding of the disclosure, illustrate embodiments of the disclosure and together with the description serve to explain the principle of the disclosure. In the drawings:

FIG. 9 is a view illustrating one of methods for transmitting a Sounding Reference Signal (SRS) used in embodiments of the present disclosure;

FIG. 24 is a view illustrating a method for configuring an EPDCCH for each DM-RS pattern;

BEST MODE FOR CARRYING OUT THE INVENTION

Figure 1:
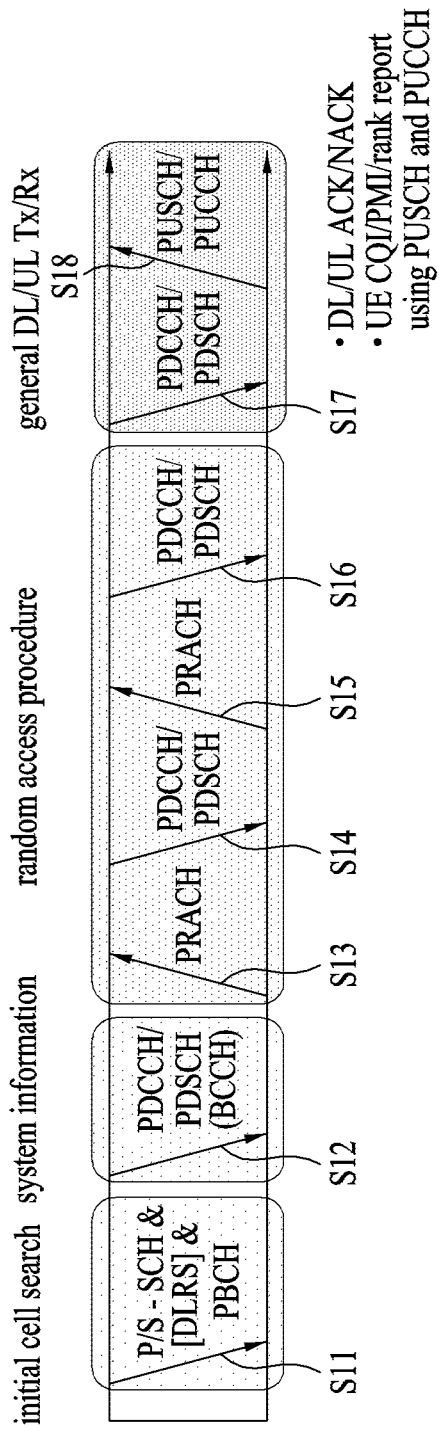
FIG. 1 is a view illustrating physical channels and a signal transmission method using the physical channels.

The present disclosure relates to a wireless access system supporting an unlicensed band, and more particularly, to methods for configuring and scheduling a partial Subframe (pSF) and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
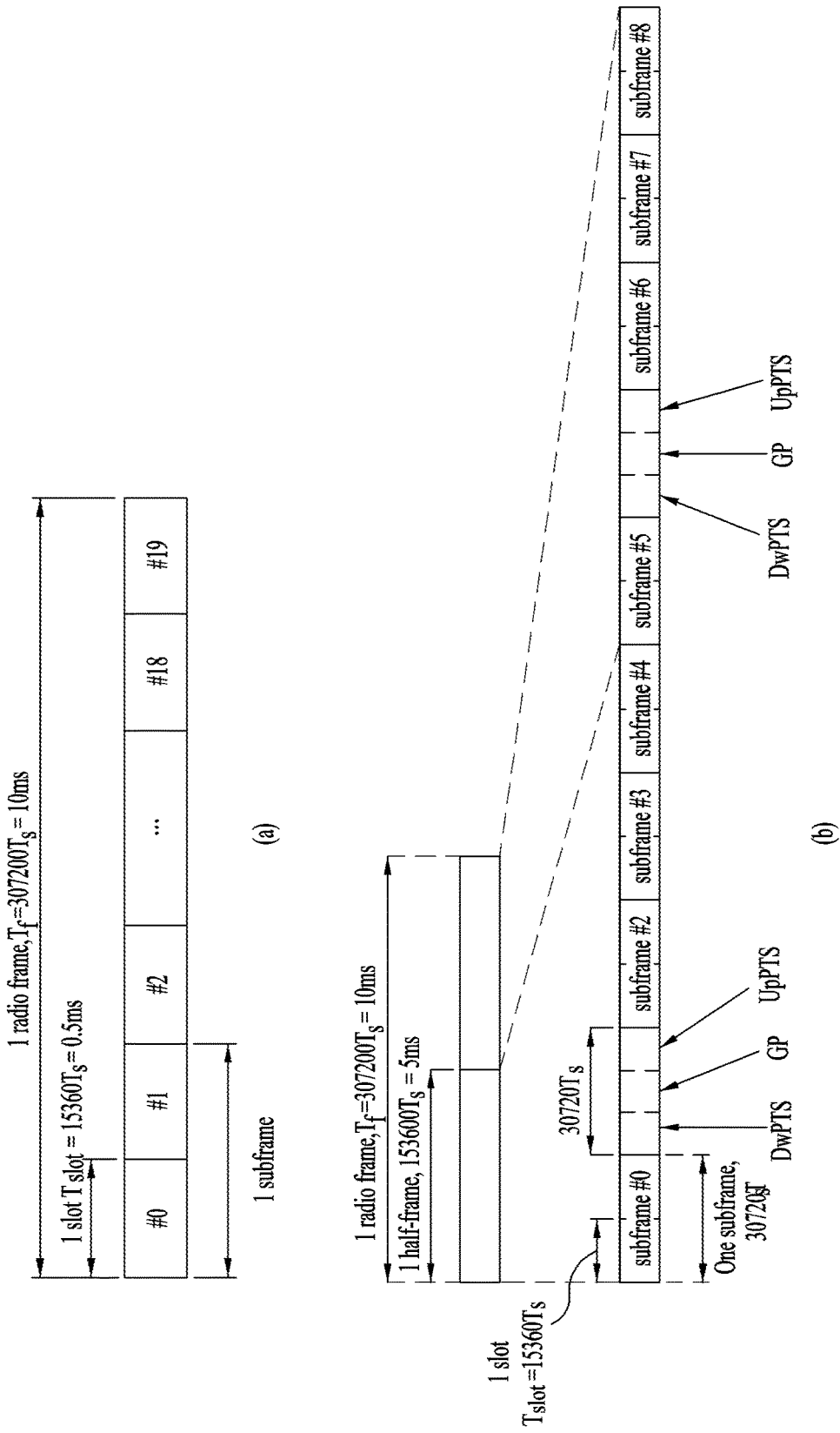
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 kHz \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). Ts is a sampling time given as $T_s=1/(15 kHz \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

|  | Normal cyclic prefix in downlink | | | Extended cyclic prefix in downlink | | |
| --- | --- | --- | --- | --- | --- | --- |
|  |  | UpPTS | |  | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
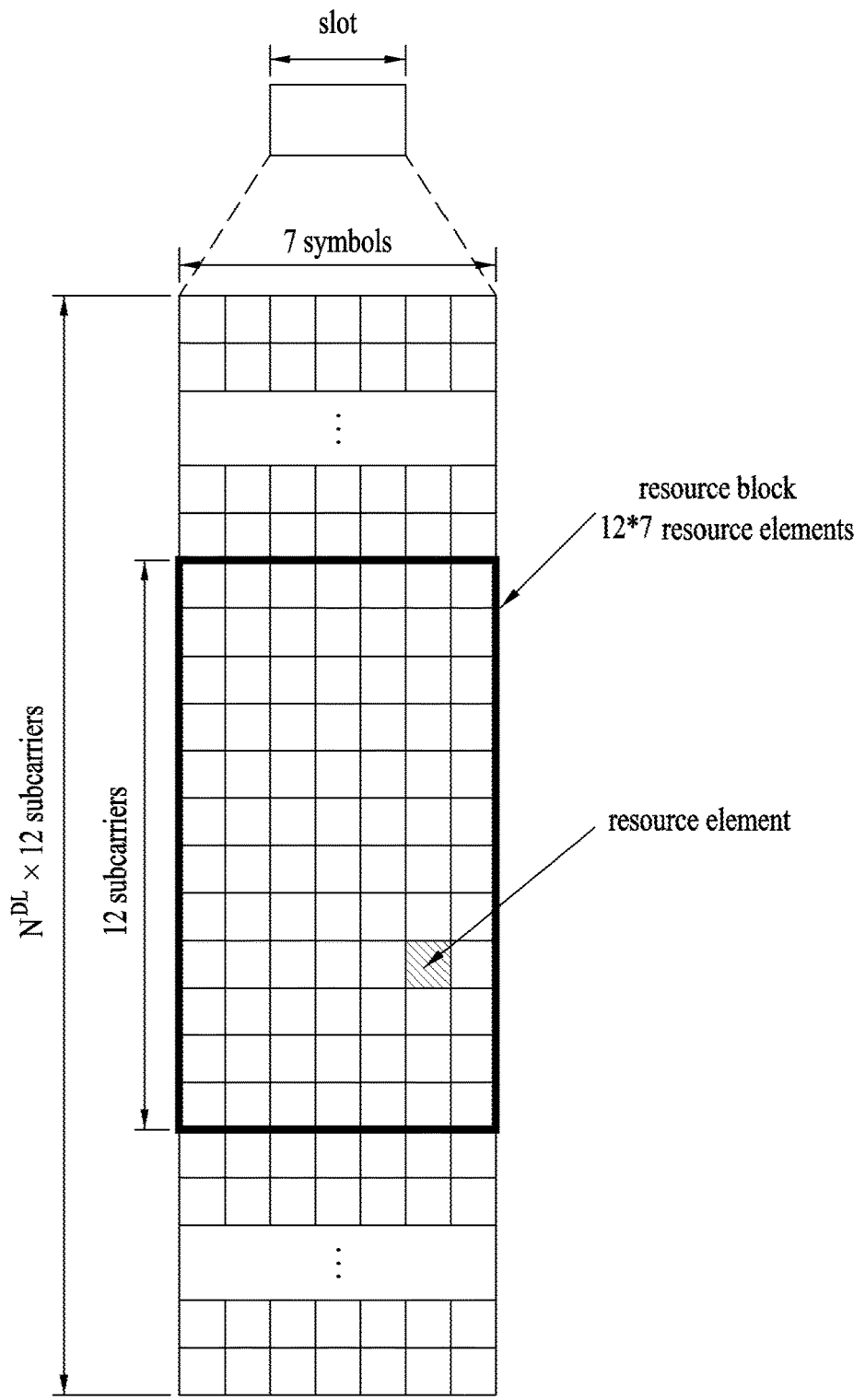
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
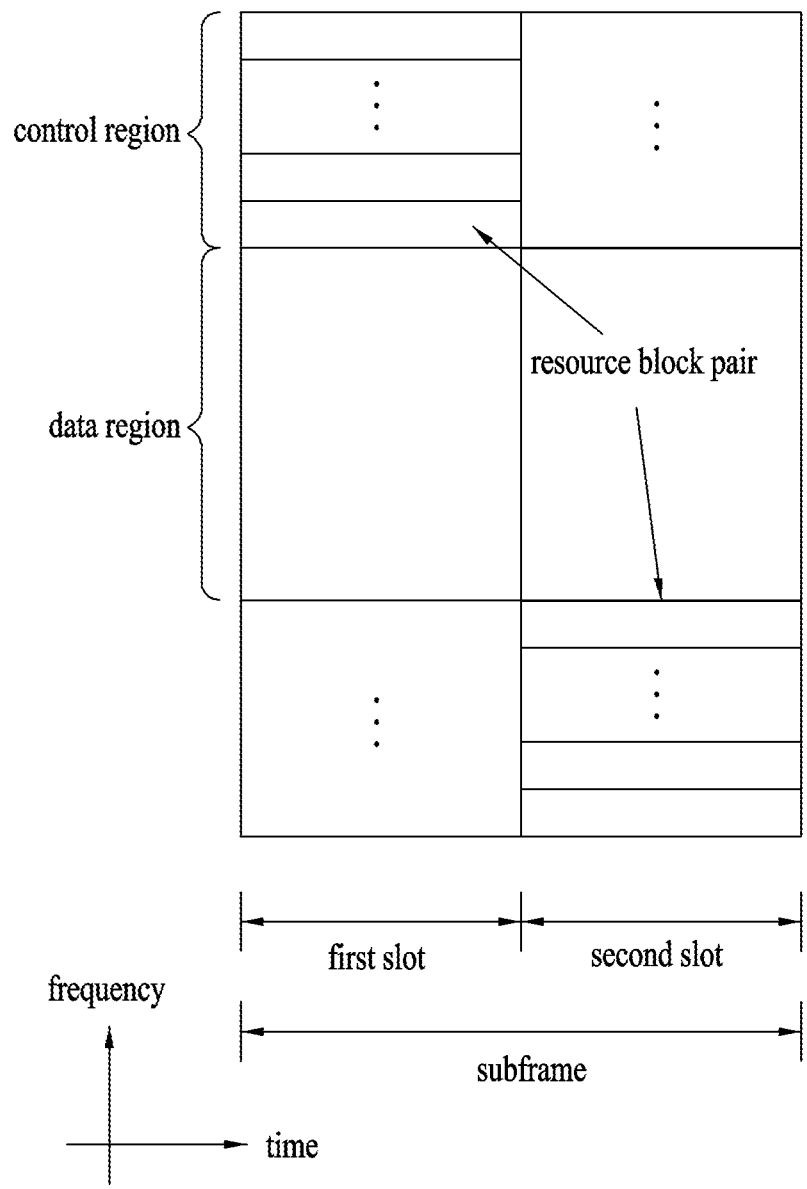
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
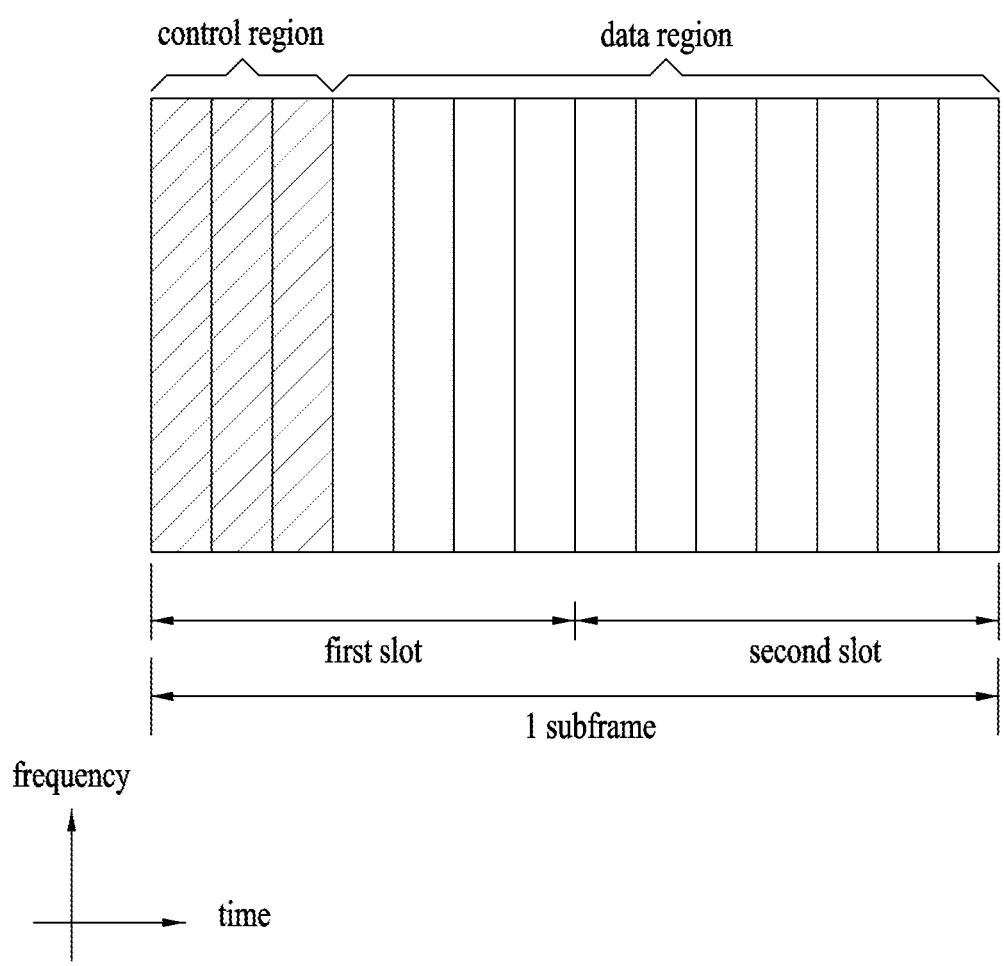
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE (=⌊$N_{REG}$/9⌋) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation: The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

TABLE 4-continued

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor L_{CCE,k}/L \rfloor\}+i \qquad \text{[Equation 1]}$$

Herein, $M^{(L)}$ is the number of PDCCH candidates with CCE aggregation level L to be monitored in the SS, m=0, ..., $M^{(L)}$−1, i is the index of a CCE in each PDCCH candidate, and i=0, ..., L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

Herein, $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
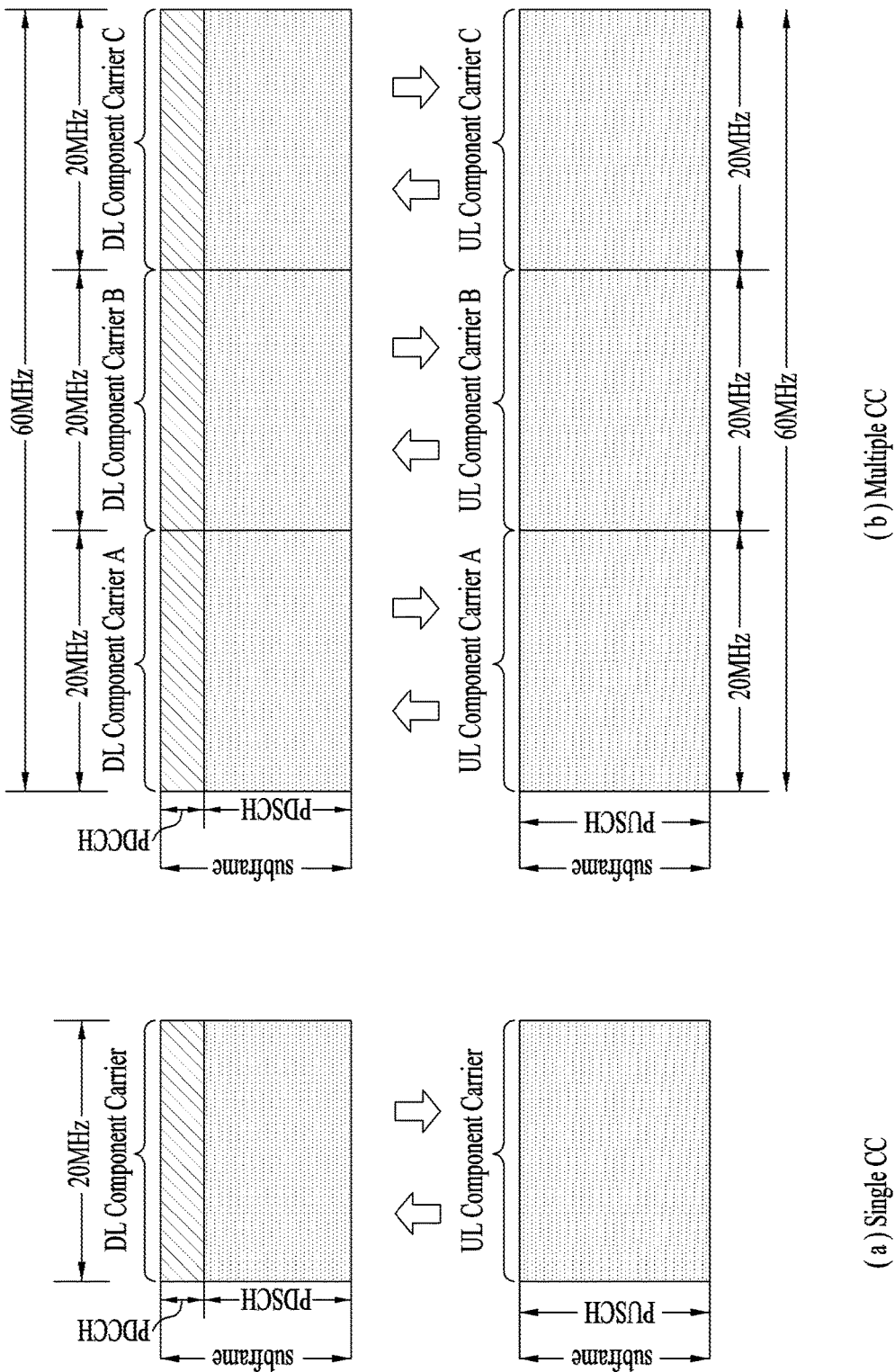
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6($a$) illustrates a single carrier structure in the LTE system. There are a DL CC and a UL CC and one CC may have a frequency range of 20 MHz.

FIG. 6($b$) illustrates a CA structure in the LTE-A system. In the illustrated case of FIG. 6($b$), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross-Carrier Scheduling

Two scheduling schemes, self-scheduling and cross-carrier scheduling are defined for a CA system, from the perspective of carriers or serving cells. Cross-carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross-carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross-carrier scheduling may be activated or deactivated UE-specifically and indicated to each UE semi-statically by higher-layer signaling (e.g. RRC signaling).

If cross-carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross-carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross-carrier scheduling is deactivated, this implies that the PDCCH monitoring set is always identical to the UE DL CC set. In this case, there is no need for signaling the PDCCH monitoring set. However, if cross-carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
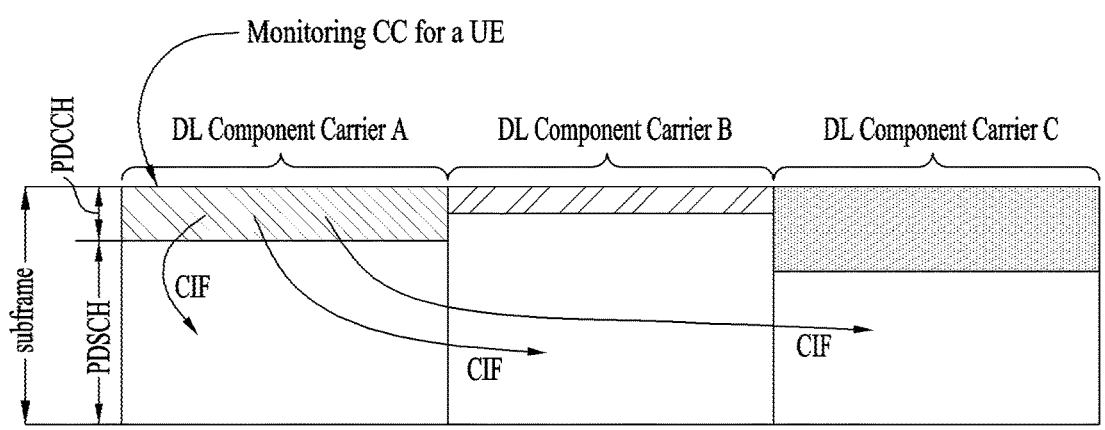
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
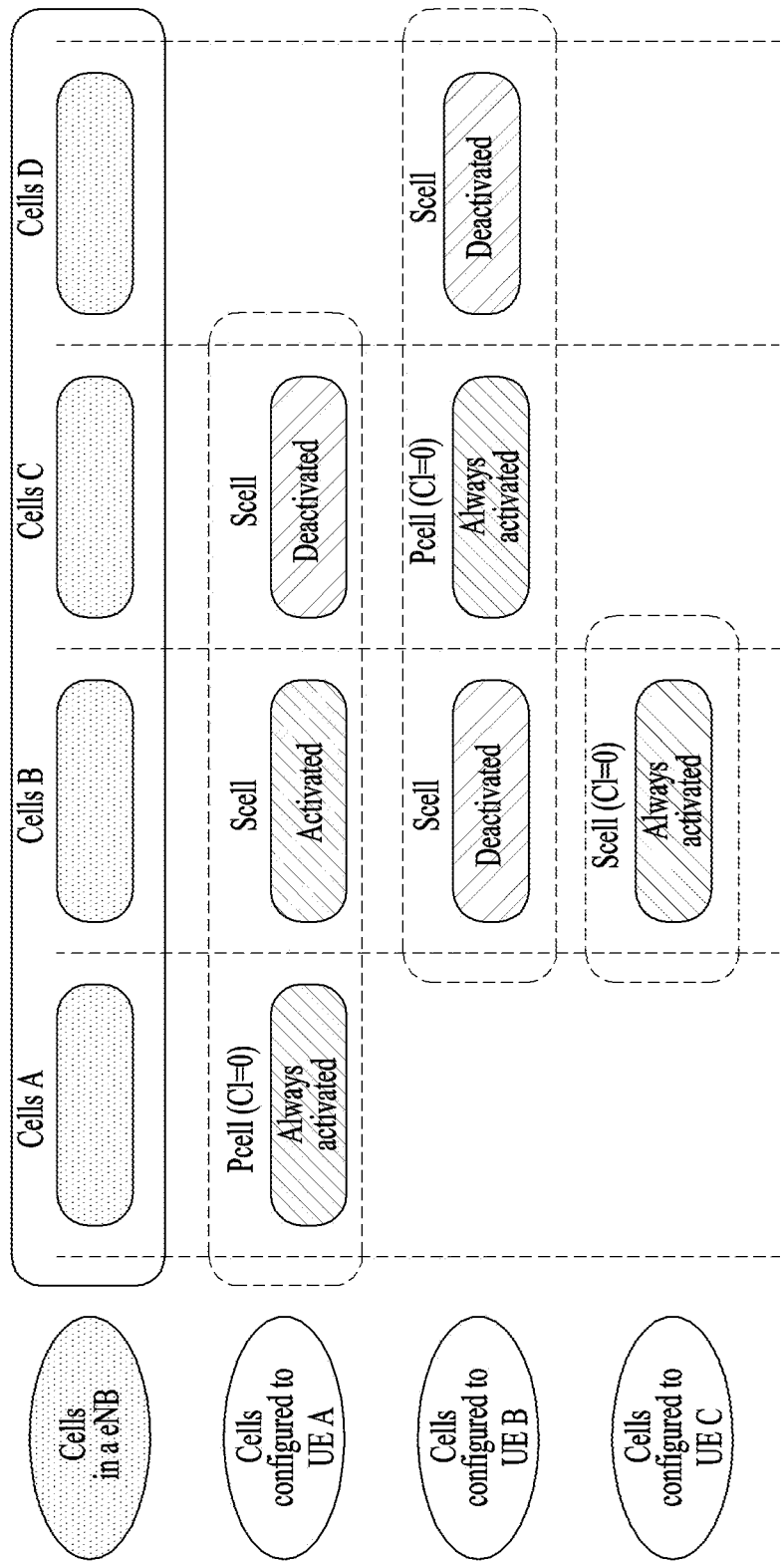
FIG. 8 is a view illustrating an exemplary serving cell configuration based on cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and Cell-specific Reference Signal (CRS) reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a CA function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as Joint Transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Hereinafter, reference signals are explained, which are used for the embodiments of the present invention.

Figure 10:
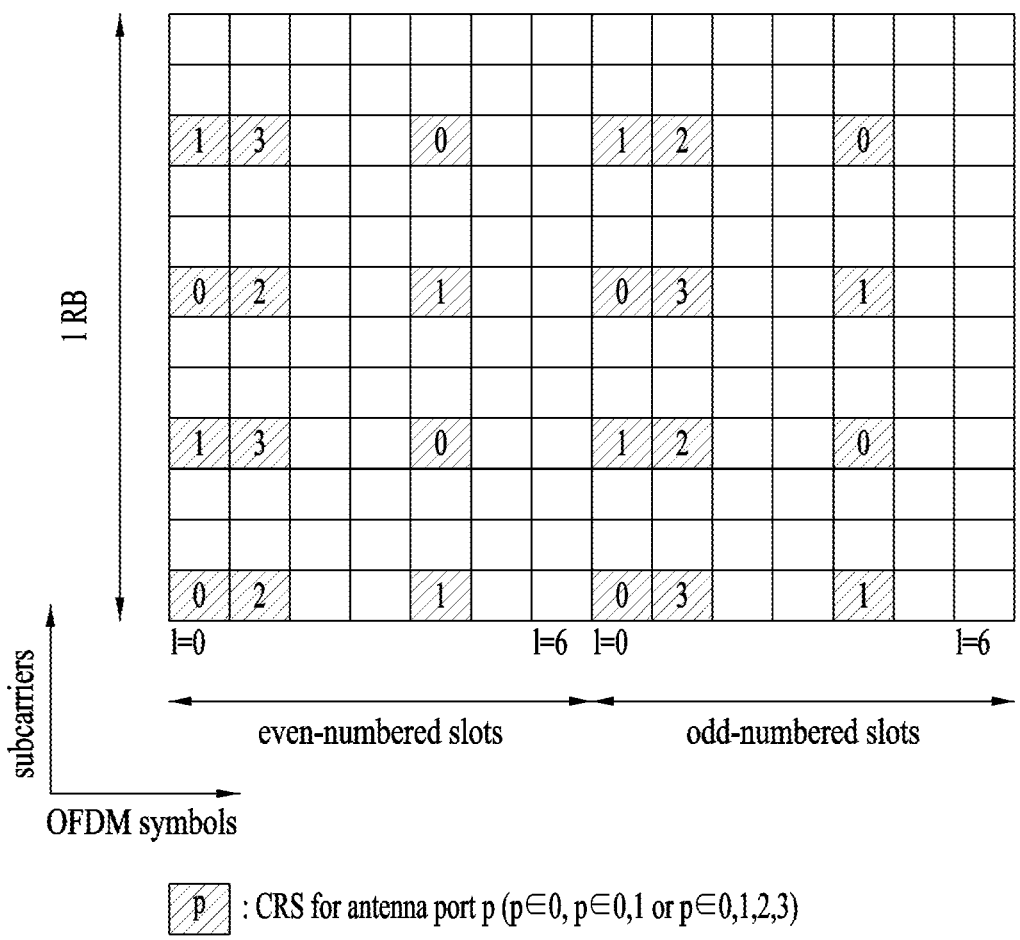
FIG. 10 is a view illustrating an exemplary subframe to which Cell-specific Reference Signals (CRSs) are allocated, which may be used in embodiments of the present disclosure.

FIG. 10 illustrates a subframe to which CRSs are allocated, which may be used in embodiments of the present disclosure.

FIG. 10 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot ns.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a Channel State Information Reference Signal (CSI-RS) are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 11:
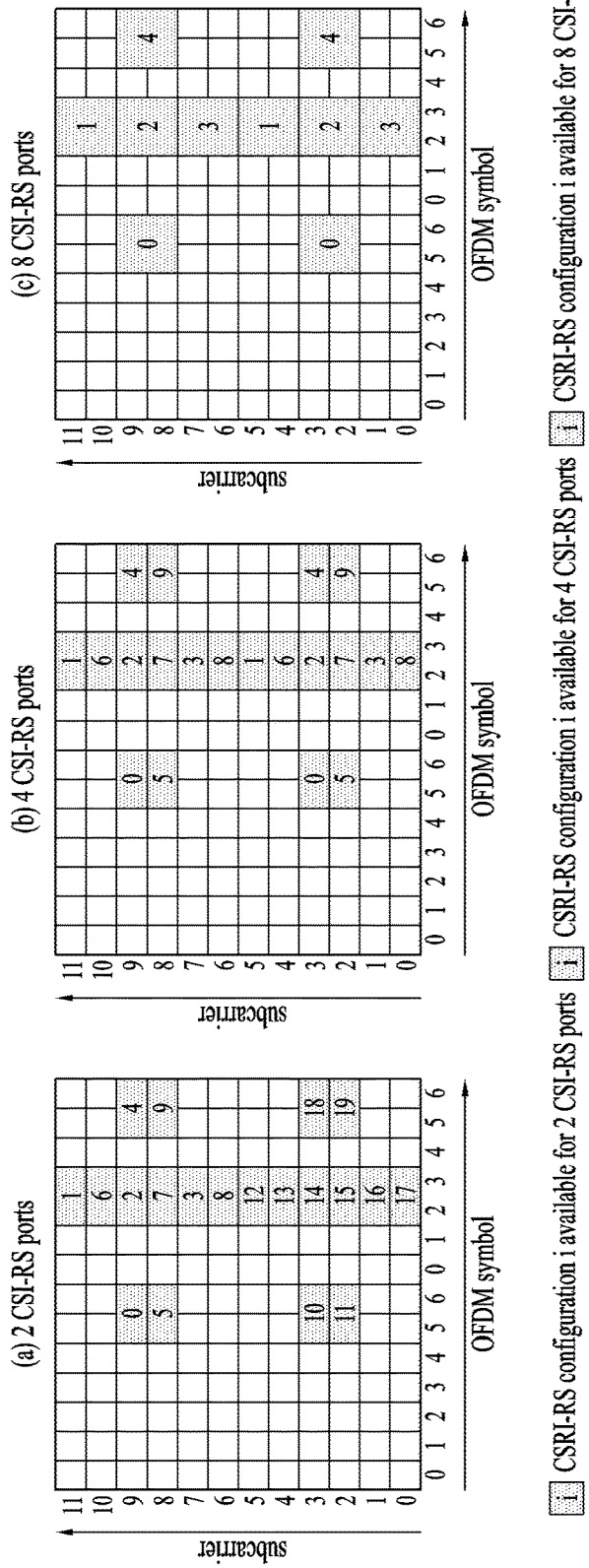
FIG. 11 is a view illustrating exemplary subframes to which Channel State Information Reference Signals (CSI-RSs) are allocated according to the number of antenna ports, which may be used in embodiments of the present disclosure.

FIG. 11 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 11(a) illustrates 20 CSI-RS configurations 0 to 19 available for CSI-RS transmission through two CSI-RS ports among the CSI-RS configurations, FIG. 11(b) illustrates 10 available CSI-RS configurations 0 to 9 through four CSI-RS ports among the CSI-RS configurations, and FIG. 11(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration ICSI-RS, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 6 shows CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following Equation 3 are subframes including CSI-RSs.

$$(10n_f+\lfloor n_s/2 \rfloor-\Delta_{CSI-RS}) \bmod T_{CSI-RS}=0 \quad \text{[Equation 3]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

2.5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 12:
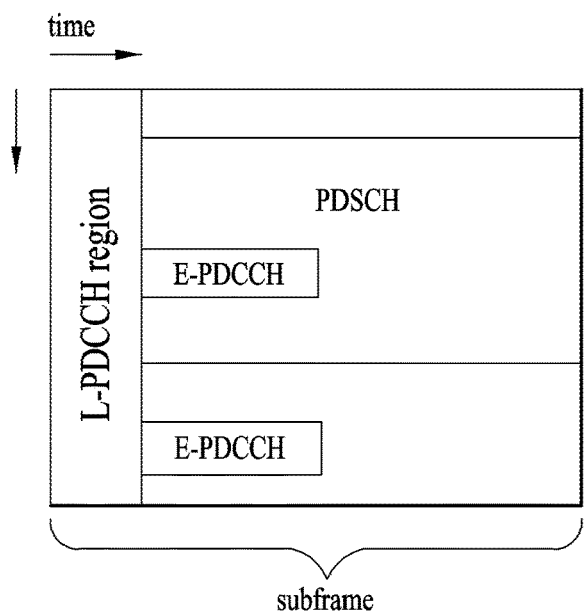
FIG. 12 is a view illustrating exemplary multiplexing of a legacy Physical Downlink Control Channel (PDCCH), a Physical Downlink Shared Channel (PDSCH), and an Enhanced PDCCH (EPDCCH) in an LTE/LTE-A system.

Meanwhile, in the LTE/LTE-A system, since a PDCCH which is a physical channel for DL/UL scheduling and transmitting various kinds of control information has a limitation that it is transmitted through limited OFDM symbols, Enhanced PDCCH (i.e., EPDCCH) multiplexed with a PDSCH more freely in a way of FDM/TDM may be introduced instead of a control channel such as PDCCH, which is transmitted through OFDM symbol and separated from PDSCH. FIG. 12 illustrates an example that legacy PDCCH, PDSCH and EPDCCH, which are used in an LTE/LTE-A system, are multiplexed.

2.6 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 7 illustrates an example of a higher-layer signal that configures CSI subframe sets.

TABLE 7

| | |
|---|---|
| CQI-ReportConfig-r10 ::= | SEQUENCE { |
| cqi-ReportAperiodic-r10 | CQI-ReportAperiodic-r10 |
| OPTIONAL, -- Need ON | |
| nomPDSCH-RS-EPRE-Offset | INTEGER (−1..6), |
| cqi-ReportPeriodic-r10 | CQI-ReportPeriodic-r10 |
| OPTIONAL, -- Need ON | |
| pmi-RI-Report-r9 | ENUMERATED {setup} |
| OPTIONAL, -- Cond PMIRIPCell | |
| csi-SubframePatternConfig-r10 | CHOICE { |

TABLE 7-continued

| | |
|---|---|
| release | NULL, |
| setup | SEQUENCE { |
| csi-MeasSubframeSet1-r10 | |
| MeasSubframePattern-r10, | |
| csi-MeasSubframeSet2-r10 | |
| MeasSubframePattern-r10 | |
| } | |
| } | |
| | OPTIONAL -- Need ON |
| } | |

[Table 7] illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig IE. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE Unlicensed (LTE-U) system 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 13:
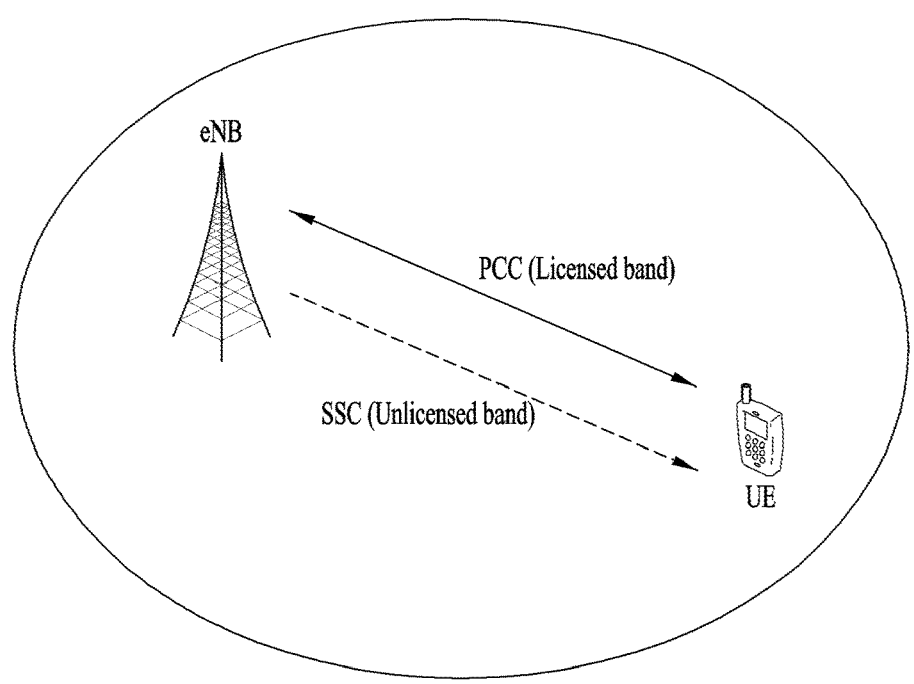
FIG. 13 is a view illustrating an exemplary CA environment supported in an LTE Unlicensed (LTE-U) system.

FIG. 13 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 13, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 13 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross-carrier scheduling mode and through PDCCH of the SCell in case of a self-scheduling mode, and may try data transmission and reception.

A CS procedure may be performed in the same manner as or a similar manner to a Listen Before Talk (LBT) procedure. In the LBT procedure, an eNB of a PCell determines whether the current state of a UCell (a cell operating in an unlicensed band) is busy or idle. For example, in the case where a Clear Channel Assessment (CCA) threshold is preset or configured by a higher-layer signal, if energy higher than the CCA threshold is detected in the UCell, the UCell is determined to be busy, and otherwise, the UCell is determined to be idle. If the UCell is determined to be idle, the eNB of the PCell may schedule resources of the UCell and perform data transmission and reception in the UCell by transmitting a scheduling grant (i.e., DCI or the like) on an (E)PDCCH of the PCell or a PDCCH of the UCell.

At this time, the eNB may configure a TxOP including N consecutive subframes. In this case, a value of N and a use of the N subframes may previously be notified from the eNB to the UE through higher layer signaling through the PCell or through a physical control channel or physical data channel. The TxOP duration comprised of M subframes may be referred to as a reserved resource period (RRP).

3.2 TxOP Duration

An eNB may transmit and receive data to and from one UE during a TxOP duration, and may configure a TxOP duration comprised of N consecutive subframes for each of a plurality of UEs and transmit and receive data in accordance with TDM or FDM. At this time, the eNB may transmit and receive data through a PCell which is a licensed band and an SCell which is an unlicensed band during the TxOP duration.

However, if the eNB transmits data in accordance with a subframe boundary of an LTE-A system corresponding to a licensed band, a timing gap may exist between an idle determination timing of the SCell which is an unlicensed band and an actual data transmission timing. Particularly, since the SCell should be used as an unlicensed band, which cannot be used exclusively by a corresponding eNB and a corresponding UE, through CS based contention, another system may try information transmission for the timing gap.

Therefore, the eNB may transmit a reservation signal from the SCell to prevent another system from trying information transmission for the timing gap. In this case, the reservation signal means a kind of "dummy information" or "a copy of a part of PDSCH" transmitted to reserve a corresponding resource region of the SCell as a resource of the eNB. The reservation signal may be transmitted for the timing gap (i.e., from the idle determination timing of the SCell to the actual transmission timing).

3.3 Method for Configuring TxOP Duration

Figure 14:
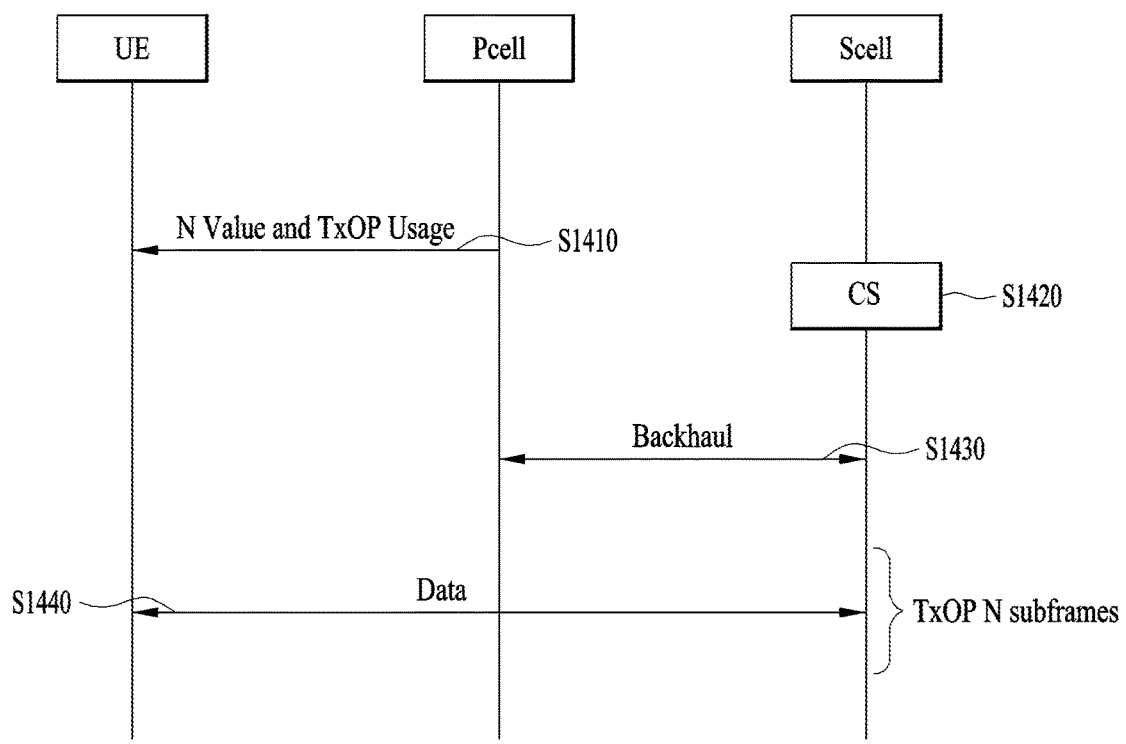
FIG. 14 is a diagram illustrating a signal flow for one of methods for configuring a Transmission Opportunity (TxOP)

FIG. 14 illustrates one of methods for configuring a TxOP duration.

An eNB may previously configure a TxOP duration semi-statically through a PCell. For example, the eNB may transmit a value of N corresponding to the number of subframes constituting the TxOP duration and configuration information on a use of the corresponding TxOP duration to a UE through a higher layer signal (for example, RRC signal) (S1410).

However, the step S1410 may be performed dynamically in accordance with system configuration. In this case, the eNB may transmit configuration information on the TxOP duration to the UE through a PDCCH or EPDCCH.

The SCell may perform a Carrier Sensing (CS) procedure to check whether a current channel state is an idle state or a busy state (S1420).

The PCell and the SCell may be managed by their respective eNBs different from each other or the same eNB. However, if the PCell and the SCell are managed by different base stations, information on a channel state of the SCell may be delivered to the PCell through a backhaul (S1430).

Afterwards, at a subframe configured as the TxOP duration, the UE may transmit and receive data through the PCell and the SCell. If the use of the corresponding TxOP is configured for downlink data transmission in step S1310, the UE may receive DL data through the SCell during the TxOP duration, and if the use of the corresponding TxOP is configured for uplink data transmission in step S1310, the UE may transmit UL data through the SCell (S1440).

In embodiments of the present disclosure, a TxOP duration may be used in the same meaning as a DL Transmission (Tx) burst, a DL burst, or an RRP. However, the DL burst or the DL Tx burst may cover a time period during which a reservation signal is transmitted for channel occupation.

4. Method for Configuring and Scheduling Partial Subframe (pSF)

Embodiments of the present inventions relate to an LTE-A system operating in an unlicensed band. This system is referred to as a License Assisted Access (LAA) system in the embodiments of the present inventions. In other words, the LAA system provides methods for transmitting and receiving data to and from an LTE UE in an unlicensed band, while still performing the basic LTE/LTE-A operations.

Considering a WiFi or inter-operate system co-existing with an LTE-A system in an unlicensed band by contention-based access, if Subframes (SFs) of an SCell are allowed to start in alignment with an SF boundary of a PCell, the LTE-A system may excessively give up a channel to another system. In this context, the LAA system may allow starting or ending of a signal transmission at a time other than an SF boundary, unlike the legacy LTE-A system. Herein, a continuous signal transmission period may be defined as a data burst. The data burst may be interchangeably used with the afore-described TxOP, RRP, or the like in the same sense.

Now, a description will be given of methods for configuring a pSF which is a smaller unit than one SF (e.g., 1 ms), when a signal transmission starts at a time other than an SF boundary and ends at a time before an SF boundary.

4.1 Cross-Carrier Scheduling

On the whole, there are two methods for scheduling a secondary cell under a CA situation in the LTE-A system. One of the methods is cross-carrier scheduling in which a specific cell schedules another cell, and the other is self-scheduling in which a cell schedules itself. Hereinbelow, methods for configuring a pSF based on cross-carrier scheduling and related methods for transmitting and operating a PDCCH will be described.

Figure 15:
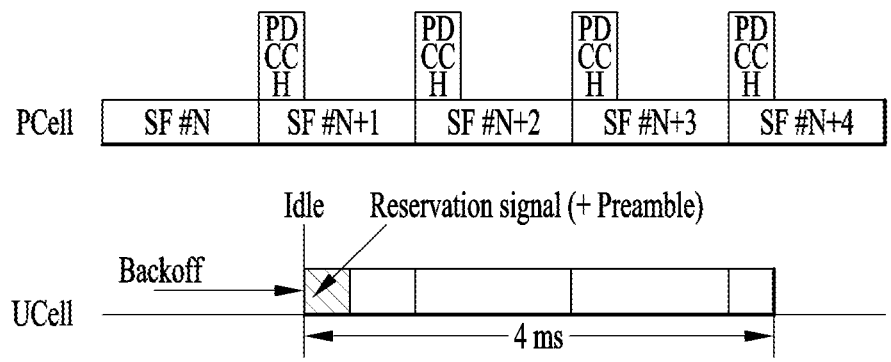
FIG. 15 is a view illustrating an exemplary partial Subframe (pSF)

FIG. 15 is a view illustrating an exemplary pSF.

In FIG. 15, in a UCell, a backoff operation for CS (e.g., a CCA or LBT operation) starts at a time corresponding to SF #N of a PCell, transmission of a reservation signal starts in the middle of SF #N+1, and transmission of a preamble and/or a PDSCH starts at a predetermined time.

In embodiments of the present disclosure, a pSF at a time of SF #N+1 of the UCell may be scheduled at a time of SF #N+2 of the PCell. This cross-carrier scheduling at a time later than the starting time of a pSF may be referred to as post-scheduling. On the other hand, cross-carrier scheduling at a time of SF #N+1 earlier than the starting time of a pSF may be referred to as pre-scheduling.

In embodiments of the present disclosure, an SF of a UCell corresponding to SF #N of a PCell is also called SF #N, for the convenience of description. FIG. 15 and other drawings will be described on the assumption that a TxOP (an RRP or a DL burst) is 4 SFs (i.e., 4 ms) long. Obviously, the TxOP duration is variable according to a channel environment and/or a system requirement.

Pre-scheduling conditions will be described below.

4.1.1 Pre-Scheduling Conditions (A-1a) The simplest pre-scheduling method is that if an eNB or a UE has data to transmit, pre-scheduling is always performed irrespective of a CCA result of the UCell shortly before the start of SF #N+1. However, if a channel is busy and thus a signal cannot be transmitted in an SF carrying a PDCCH, corresponding PDCCH resources may be wasted. Therefore, it is preferred that even though the eNB has data to transmit, only when the probability of transmitting the data in the corresponding SF is high, the eNB transmits the data in the SF. This condition will be described below.

(A-1b) Only if the CCA result shortly before the start of SF #N+1 is an idle state, pre-scheduling may be allowed.

In view of the nature of systems co-existing in an unlicensed band, once a specific transmitter occupies a channel, it may continuously occupy the channel for a very long time. Therefore, if the CCA result shortly before the start of SF #N+1 is a busy state, the eNB may not transmit a signal continuously in a corresponding SF. If the channel is busy all the time in SF #N+1 and thus a signal cannot be transmitted in the UCell, PDCCH resources may be wasted due to pre-scheduling in SF #N+1. To avoid the problem, only if the CCA result shortly before the start of SF #N+1 is the idle state, the eNB may be allowed to perform pre-scheduling.

If the CCA result shortly before the start of SF #N+1 is the busy state, the eNB may not perform CS in the corresponding SF. Or if the CCA result shortly before the start of SF #N+1 is the busy state but a backoff operation ends due to an idle period in the middle of SF #N+1, the eNB may not start an SF and thus should transmit a reservation signal.

(A-1c) Only if the CCA result shortly before the start of SF #N+1 is the idle state and the backoff operation ends during SF #N+1, pre-scheduling may be allowed.

For example, it is assumed that when the eNB performs the backoff operation, a backoff count is 'N' and T3 ms is required until the backoff count becomes '0'. If T3 ms is longer than 1 ms, the eNB may not start an SF transmission in spite of a continuous channel idle state in SF #N+1.

Accordingly, when the condition that the CCA result shortly before the start of SF #N+1 is the idle state and T3<=X is satisfied, the eNB may be configured to perform pre-scheduling. If X=1 ms, pre-scheduling is performed on the assumption that the channel is always idle in SF #N+1.

On the other hand, if the CCA result shortly before the start of SF #N+1 is busy or T3>X, the eNB does not perform pre-scheduling in the corresponding SF. As described in relation to condition (A-1b), if the CCA result shortly before the start of SF #N+1 is the busy state, the eNB may not perform the CS and backoff operation in the corresponding SF.

Or if the UCell is busy shortly before SF #N+1 but the eNB ends the backoff operation due to an idle period in the idle of SF #N+1 during CS, the eNB may not start an SF. Thus, the eNB preferably transmits a reservation signal.

(A-1d) Only if the backoff operation may end in SF #N+1, the eNB may be allowed to perform pre-scheduling irrespective of the CCA result shortly before the start of SF #N+1. Similarly to condition (A-1c), for example, if the condition that T3<=X is satisfied, the eNB may perform pre-scheduling. On the contrary, if T3>X, the eNB does not perform pre-scheduling in a corresponding SF.

(A-1e) Even though the CCA result shortly before the start of SF #N+1 is the busy state, if the eNB is able to determine when on-going transmission of a current transmission node (e.g., a current transmitter) will end, the eNB may perform pre-scheduling in consideration of the determination.

Figure 16:
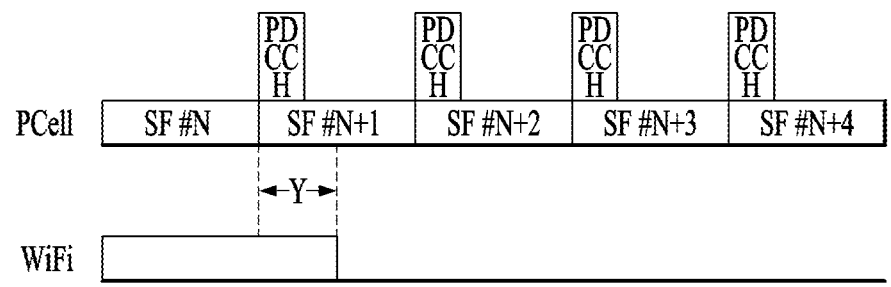
FIG. 16 is a view illustrating one of conditions that allow a Base Station (BS) to perform pre-scheduling, when a Wireless Fidelity (WiFi) Access Point (AP) occupies a radio channel in an unlicensed band.

For example, it is assumed that the current transmitter is a WiFi AP and a WiFi signal can be received in the PCell, as illustrated in FIG. 16. FIG. 16 illustrates one of conditions that allow the eNB to perform pre-scheduling, when the WiFi AP occupies a radio channel in an unlicensed band.

It may be noted from FIG. 16 that if the eNB is able to decode the WiFi signal, the eNB of the PCell may be aware that on-going transmission of WiFi data ends Y ms (0<Y<1 ms) after the start of SF #N+1. On the assumption that T3 ms is required until a backoff count becomes 0, the eNB may perform pre-scheduling only when the condition that Y+T3<X is satisfied.

Figure 17:
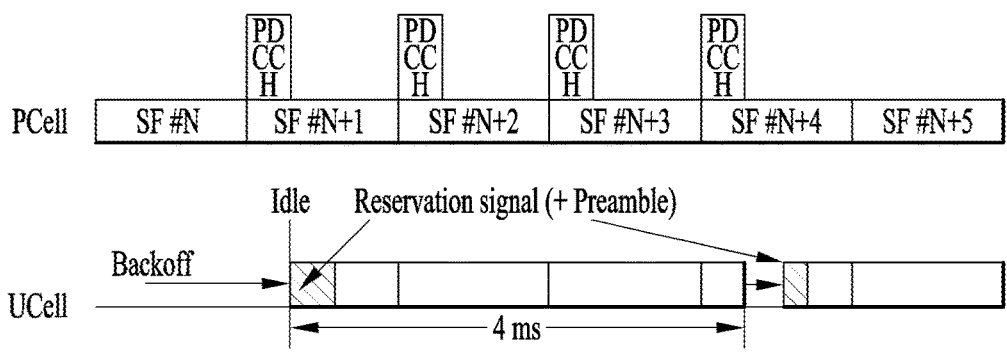
FIG. 17 is a view illustrating a pSF.

The above-described conditions (A-1a) and (A-1d) are also applicable to an SF in which another system or another transmitter is transmitting data in the UCell. For example, this is because two pSFs may exist in one SF like SF #N+1 in FIG. 17. FIG. 17 is a view illustrating pSFs.

In the case of condition (A1-d), in the case where a transmission ends in a pSF of SF #N+4 during the previous TxOP, only when the eNB is able to end the backoff operation in SF #N+4, the eNB may be allowed to perform pre-scheduling.

4.1.2 A/N Transmission Method

Now, a method for transmitting a reception confirm signal (e.g., an ACK or NACK signal) in the case of pre-scheduling will be described. For example, it is assumed that the eNB transmits a reservation signal (and/or a preamble) and a PDSCH in SF #N+1 of the UCell, as illustrated in FIG. 15.

If a UE has successfully received a PDCCH in the PCell but has failed to detect the preamble and/or an RS on the PDSCH in the UCell, the UE may determine that a channel in the UCell is busy and thus no signal is transmitted on the channel in the corresponding SF. Consequently, the UE may nether attempt PDSCH decoding nor buffer the corresponding SF.

In regard to a CA situation in the LTE-A system, only two operations are available: one of the operations is that the UE fails in PDCCH decoding, and the other is that although the UE succeeds in PDCCH decoding but fails in PDSCH decoding and thus stores a corresponding PDSCH in a buffer. The UE may transmit a Discontinuous Transmission (DTX) signal in ACK/NACK resources in the former case and a NACK signal in the ACK/NACK resources in the latter case. DTX means non-transmission of an ACK/NACK or a specific state of ACK/NACK transmission.

In other words, non-transmission of an ACK/NACK from the UE is equivalent to an ACK/NACK operation of the UE in the absence of data to be transmitted in the UCell from the eNB. However, a new state indicating that the UE has succeeded in receiving a PDCCH but has not stored a failed PDSCH in a buffer needs to be additionally considered in an LAA environment. Hereinbelow, a method for defining such a new state will be described.

(A-2a) If the UE successfully receives a PDCCH but fails to detect a preamble (and/or an RS on a PDSCH) or the UE succeeds in detecting a preamble (and/or an RS on a PDSCH) but fails in PDSCH decoding, the UE may regard this case as a NACK state or a DTX state, which will be described in greater detail in relation to later-described (A-2b) to (A-2e).

(A-2b) If the UE succeeds in receiving a PDCCH but fails in detecting a preamble (and/or an RS on a PDSCH), the UE may be configured to transmit a NACK signal. In this case, although the eNB is aware that the UE has successfully received at least the PDCCH, the eNB may not determine clearly whether the UE has stored the related PDSCH in the buffer.

(A-2c) If the UE succeeds in receiving a PDCCH but fails in detecting a preamble (and/or an RS on a PDSCH), the UE may be configured to transmit a DTX signal. In this case, the eNB may clearly determine that the UE has not stored the related PDSCH in the buffer.

Further, when the eNB has performed pre-scheduling but has not transmitted data in a corresponding SF due to a busy channel, the UE may also be configured not to perform ACK/NACK transmission.

In this case, in fact, an ACK/NACK overhead caused by pre-scheduling that does not configure an SF in the UCell may be reduced. However, if the eNB does not receive an A/N signal from the UE, the eNB may wrongly determine PDCCH detection failure and thus unnecessarily increase PDCCH transmission power or a PDCCH aggregation level.

(A-2d) When the eNB performs cross-carrier scheduling in the PCell, it is assumed that the aggregation levels of a PCell-PDCCH and a UCell-PDCCH are equal. If the UE has succeeded in receiving the UCell-PDCCH, the UE attempts ACK/NACK transmission using an A/N Resource Indicator (ARI) on the UCell-PDCCH in the legacy LTE-A CA situation.

Even though the UE has succeeded in receiving the UCell-PDCCH, if the UE fails in detecting a preamble (and/or an RS on a PDSCH), the UE may be configured to fall back to PUCCH format 1a/1b without using the ARI. Upon receipt of an ACK/NACK in PUCCH format 1a/1b from the UE, the eNB may implicitly interpret that the UE has succeeded in receiving the UCell-PDCCH but has failed in detecting the preamble (and/or an RS on the PDSCH) on the assumption that the success probabilities of the PCell-PDCCH and the UCell-PDCCH are close due to their equal aggregation levels.

(A-2e) If the UE has succeeded in receiving a PDCCH but has failed in detecting a preamble (and/or an RS on a PDSCH), the UE may set a new state other than NACK/DTX, for A/N signal transmission, thereby overcoming ambiguity mentioned in (A-2b) and (A-2c).

For example, a state indicating the case in which the UE has succeeded in receiving a PDCCH but has failed in detecting a preamble (and/or an RS on a PDSCH) may be defined as DTX2. The DTX2 state may be defined distinguishably from ACK/NACK/DTX states of the LTE-A system, and the UE may feed back the DTX2 state to the eNB.

In an aspect of the embodiment, a new channel selection transmission table including DTX2 may be configured in the system.

In another aspect of the embodiment, 2-bit ACK/NACK information per Transport Block (TB) may be configured, inclusive of ACK=11, NACK=10, DTX=00, and DTX2=01 in the system.

Only if the eNB is able to recognize from the new DTX2 state defined in the above methods that the UE has failed in detecting a preamble (and/or an RS on a PDSCH), the eNB receiving the feedback of DTX2 may increase transmission power in order to increase the detection probability of the next preamble (and/or an RS on the next PDSCH).

4.1.3 Pre-Scheduling Method

Figure 18:
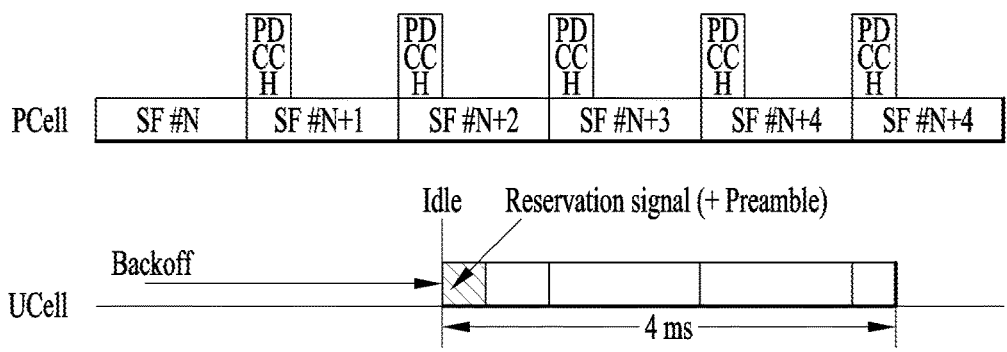
FIG. 18 is a view illustrating one of pre-scheduling methods.

In pre-scheduling, it may occur that although the eNB has transmitted a PDCCH at a time of SF #N+1 of the PCell, the backoff operation is not completed in SF #N+1 and thus the eNB is not able to transmit a PDSCH in the UCell, as illustrated in FIG. 18. FIG. 18 is a view illustrating one of pre-scheduling methods.

In this case, when the UE attempts to detect a preamble (and/or an RS on a PDSCH) in SF #N+1, a false alarm may be generated, in which the UE takes the absence of a preamble (and/or an RS on a PDSCH) for the presence of a preamble (and/or an RS on a PDSCH). To prevent the problem, upon receipt of the PDCCH, the UE may buffer a PDSCH of a corresponding SF irrespective of the presence or absence of a preamble (and/or an RS on a PDSCH).

The eNB may transmit a PDCCH a plurality of times to the same UE until a backoff operation ends. If the eNB indicates transmission of a new PDSCH (i.e., a new packet) at each PDCCH transmission, the UE may buffer a PDSCH each time it receives a PDCCH, and if the UE recognizes a new packet, it may flush already-buffered data.

For example, referring to FIG. 18, even though the UE has buffered a PDSCH in SF #N+1, the UE will receive a PDCCH indicating a new packet and thus a new PDSCH (i.e., a new packet) in SF #N+2. Therefore, the UE may flush the data buffered in SF #N+1.

In an exemplary method for transmitting a new packet in SF #N+2 by the eNB, the eNB may configure the same HARQ process number as that of a PDCCH transmitted in SF #N+1 and toggle a New Data Indicator (NDI), for a PDCCH transmitted in SF #N+2.

Further, in the case where the eNB has transmitted in a PDCCH at a time of SF #N+1 but is not able to transmit a PDSCH in the UCell due to an ongoing backoff operation as illustrated in FIG. 18, the eNB may be configured to transmit the same PDCCH a plurality of times to the same UE.

Hereinbelow, a description will be given of methods for overcoming resource waste of a PDCCH in this case.

Once the eNB transmits a PDCCH to a specific UE, the eNB may not transmit the PDCCH repeatedly even though the eNB cannot transmit a PDSCH in a corresponding SF and transmits the PDSCH in the next SF. For example, referring to FIG. 18, the eNB may not transmit a PDCCH which has been transmitted in SF #N+1, in SF #N+2. If the UE receiving the PDCCH in SF #N+1 does not receive a PDSCH in SF #N+1, the UE may use the same PDCCH information received in SF #N+1 in SF #N+2. The PDCCH information received in SF #N+1 may be regarded as valid until the UE receives data on a PDSCH.

Or the eNB may transmit new PDCCH information as a replacement of the PDCCH information in SF #N+1 to the UE at a time of SF #N+k. It may be indicated that the PDCCH information is new by DCI (e.g., a scrambling sequence, a CRC mask, a search space, and/or a new indicator).

Or if the PDCCH received in SF #N+1 satisfies a predetermined condition, the UE may consider that the PDCCH is not valid. For example, a specific timer value, T1 may be configured by higher-layer signaling, and the PDCCH received in SF #N+1 may be considered to be invalid from a time of SF #N+1+T1.

A method for configuring an ACK/NACK timing and resources for a PDSCH will be proposed. It is assumed that even though the UE receives a PDCCH in SF #N+1, a time at which scheduling information received on the PDCCH is used (i.e., an actual PDSCH transmission time) is SF #N+m, not SF #N+1. It may be regulated that an ACK/NACK transmission timing is set based on SF #N+1. For example, the UE may transmit an ACK/NACK signal in SF #N+m+4 to the eNB in an FDD system. ACK/NACK resources for the ACK/NACK signal may be configured by a CCE index of the PDCCH received in SF #N+1. Or the UE may transmit the ACK/NACK signal at a time of SF #N+m+4 using resources preset by higher-layer signaling.

4.1.4 Method for Configuring Starting Time of PDSCH

In the case of cross-carrier scheduling, configuration of the starting time of a PDSCH in a scheduled cell, UCell will be described below.

In the case of (E)PDCCH-based cross-carrier scheduling in the LTE-A system, it may be regulated that the starting time of a scheduled UCell is determined based on the starting symbol of a PDSCH configured in the scheduled cell. The starting symbol of the PDSCH may be configured by RRC signaling. Particularly in the case of cross-carrier scheduling for a pSF, the starting PDSCH symbol configured by RRC signaling may not be regarded as valid.

The starting time of the PDSCH may be determined according to the starting position of the pSF. For example, if a PDCCH region is preset to include two symbols by higher-layer signaling, the UE may determine that the PDSCH starts two symbols after the starting position of the pSF.

If cross-carrier scheduling is performed by an EPDCCH, the starting symbol of the EPDCCH may be determined according to the length of the pSF. For example, even though the starting symbol of the EPDCCH is configured to be a $4^{th}$ OFDM symbol by higher-layer signaling, if the starting position of the pSF in the scheduled cell, UCell is a $7^{th}$ OFDM symbol, the starting symbol of the EPDCCH in a scheduling cell may be determined to be the $7^{th}$ OFDM symbol. Therefore, when performing buffering in the scheduling cell, the UE advantageously starts the buffering at the starting time of the pSF in the UCell.

4.1.5 Method for Restricting Scheduling Scheme

In the methods described in Section 4.1 (i.e., in the case of cross-carrier scheduling for a pSF), pre-scheduling may cause PDCCH waste because an actual time of completing a CCA operation (CS or LBT operation) in a UCell cannot be predicted, and post-scheduling may have a problem in terms of UE buffering. Therefore, the LAA system may be configured so as to allow only self-scheduling, not cross-carrier scheduling, for a pSF.

If the eNB should perform cross-carrier scheduling at a transmission time of a pSF, the pSF may not include a PDSCH. For example, the pSF may simply include dummy signals, for channel occupation.

Or the pSF may be configured only for the usage of synchronization, Automatic Gain Control (AGC) setting and/or cell identification.

Or if cross-carrier scheduling is configured for a UE, the UE may not expect a pSF. This means that the UE decodes corresponding SFs, assuming that SFs of the UCell scheduled by the PCell are normal SFs, not pSFs.

In this case, a pSF may be confined to later-described PStart. For example, cross-carrier scheduling may be applied to PEnd.

4.2 Self-Scheduling

Self-scheduling methods will be described below. A pSF configured in the UCell may be self-scheduled through a PDCCH and/or an EPDCCH. Self-scheduling methods as described below can be applicable to a PStart which is a pSF starting before an SF boundary, a full SF being a normal SF, and/or a PEnd which is a pSF ending before a normal SF.

4.2.1 Self-Scheduling Using PDCCH

Figure 19:
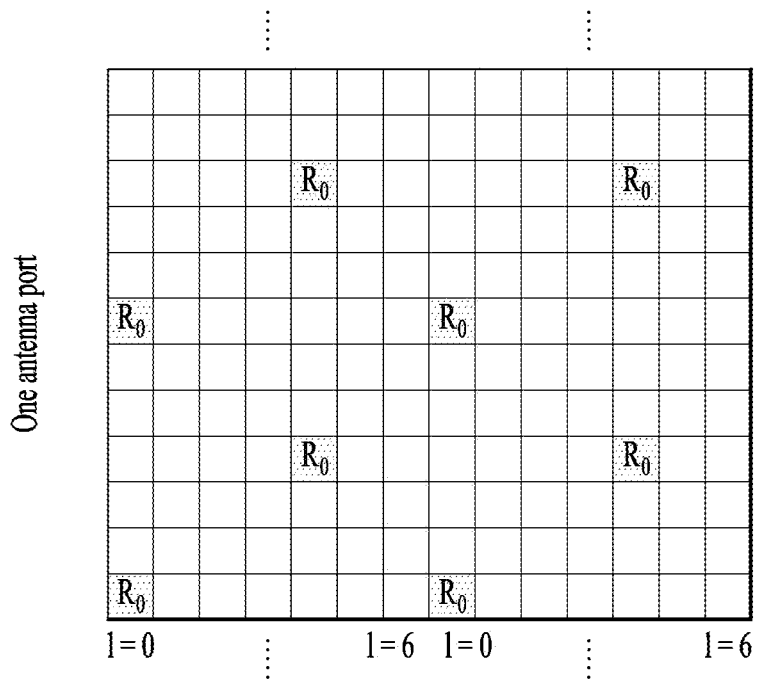
FIG. 19 is a view illustrating one of CRS patterns.

The starting time of a PDCCH in the UCell may be set to the ending time of a preamble transmission after completion of a CCA operation (CS or LBT operation). Or the starting time of the PDCCH may be set to one of symbols for CRS port 0. FIG. 19 is a view illustrating one of CRS patterns. Referring to FIG. 19, CRS port 0 is allocated to $1^{st}$, $5^{th}$, $8^{th}$, and $12^{th}$ symbols. Therefore, the transmission time of the PDCCH may be set to one of the symbols to which CRS port 0 is allocated.

The time-axis length of the PDCCH may be a value preset by higher-layer signaling.

Or the time-axis length of the PDCCH may be predetermined according to the length of a pSF. For example if the pSF is longer than the length of one slot, the PDCCH may be transmitted in 2 OFDM symbols, whereas if the pSF is shorter than the length of one slot, the PDCCH may be transmitted in one OFDM symbol.

In the legacy LTE-A system, the starting time of a PDCCH is determined by the value of a PCFICH. In the absence of a PCFICH in the UCell, the starting time of the PDCCH may be determined according to a value preset by higher-layer signaling. For example, if the starting time of the PDCCH is preset to a $5^{th}$ symbol ($1^{st}$ slot, l=4) and the length of the PDCCH is preset to one symbol, the starting time of a PDSCH may be determined to be a $6^{th}$ symbol ($1^{st}$ slot, l=5).

Or in the presence of a PCFICH in the UCell, a PCFICH value for a pSF may be interpreted differently from a PCFICH for a legacy SF. For example, if the pSF starts in a $5^{th}$ symbol ($1^{st}$ slot, l=4) and the PCFICH value is 2, a UE may determine that the PDSCH starts in a $7^{th}$ ($5+2^{th}$) symbol.

Or in the absence of a PCFICH, the time-axis length of the PDCCH may be preset. Further, only when the first SF of a TX burst is a pSF, a PCFICH (and a PHICH) does not exist and the time-axis length of the PDCCH may be preset or set by higher-layer signaling (e.g., RRC signaling).

In embodiments of the present disclosure, the UE may perform BD on a PDCCH, considering that there are two control regions in the UCell. For example, in regard to a normal SF, the UE may determine the first to third symbols of the SF to be a control region. On the other hand, in regard to a pSF, the UE may perform BD, determining that the first and second symbols of the second slot to be a control region.

The methods described in Section 4.2.1 are applied to a PStart pSF.

4.2.2 Downlink Physical Channel in Floating SF Structure

Figure 20:
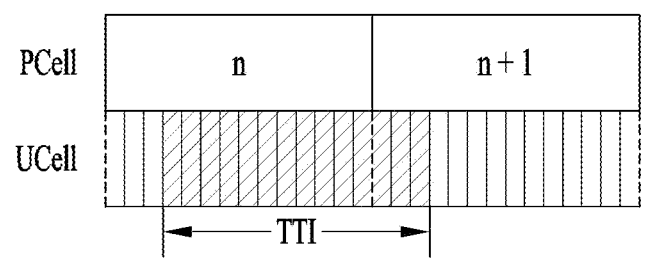
FIG. 20 is a view illustrating a method for transmitting a downlink physical channel in a floating subframe.

FIG. 20 is a view illustrating a method for transmitting a DL physical channel in a floating SF.

The floating SF illustrated in FIG. 20 refers to an SF configured in such a manner that the size of a UCell SF is equal to the size of a PCell SF, and the starting and ending points of the UCell SF may not match SF boundaries of a PCell.

Referring to FIG. 20, in spite of completion of an LBT operation at a time other than an SF boundary, the eNB may transmit an SF, while always maintaining a TTI of about 1 ms. Even though the starting and ending points of the TTI are not aligned with SF boundaries of the PCell, SF boundaries aligned between the UCell and the PCell are still valid, and an RS and a PDCCH of the UCell may be configured based on a PCell timing.

If the starting position of a TTI does not match an SF boundary, information about scheduling of the TTI may be received on a PDCCH in SF #(n+1). The length of the PDCCH may be determined by a PCFICH in the UCell or preset by higher-layer signaling.

Only when the length of the PDCCH is set to 2 or more OFDM symbols, the starting position of the TTI may be restricted. For example, if the PDCCH length is 2 OFDM symbols, it may be regulated that the TTI should not start in the second OFDM symbol of SF #n. This is because if the TTI starts in the second OFDM symbol, the PDCCH may be transmitted separately in the second OFDM symbol of SF #n and the first OFDM symbol of SF #(n+1) and as a result, successful decoding of the PDCCH may not be ensured.

Similarly, if the PDCCH length is 3 OFDM symbols, it may be regulated that the TTI should not start in the second and third OFDM symbols of SF #n.

In the floating SF structure illustrated in FIG. 20, the first three OFDM symbols of SF #n may be punctured, REs of a PDSCH may be mapped to the remaining OFDM symbols of SF #n, and the three punctured OFDM symbols may be mapped to SF #n+1, for transmission. Or RE mapping may newly start based on the starting position of the TTI.

4.2.3 Self-Scheduling Using EPDCCH

In the LTE-A system, the starting symbol of an EPDCCH is configured by RRC signaling, and ranges from 1 to 4.

However, in the case of a pSF of the LAA system in which an SF has a variable length according to the idle/busy state of a channel, the starting position of the EPDCCH may be set to the ending time of transmission of a preamble or the starting time of an RS (e.g., one of symbols to which RSs for CRS port 0 are allocated) on a PDSCH. In other words, the UE may consider that information about the starting symbol of the EPDCCH in the UCell, configured by RRC signaling is not valid for the pSF.

Nonetheless, a value set by RRC signaling may be still used as the number of PRBs in the EPDCCH.

Or the number of PRBs in the EPDCCH may be preset according to the length of the pSF, aside from legacy RRC signaling. For example, if the number of OFDM symbols in the pSF is less than 7, the number of PRBs in the EPDCCH may be set to 8, and if the number of OFDM symbols in the pSF is equal to or greater than 7, the number of PRBs in the EPDCCH may be set to 4.

As the starting symbol of the staring an SF of a DL burst (TxOP, RRP, or the like) is variable, the ending symbol of the ending SF of the DL burst may also be set to be variable in order to efficiently use radio resources. If the length of the EPDCCH is also variable according to the position of the ending symbol, the implementation complexity of the UE self-scheduled by the EPDCH may be increased.

To solve the problem, the ending symbol of every EPDCCH may be set to be a specific OFDM symbol that does not match an SF boundary. For example, if the minimum length of the ending SF of the DL burst is set to 11 OFDM symbols, the ending symbol of the EPDCCH may always be set to be the $11^{th}$ OFDM symbol. The ending symbol of the EPDCCH may be preset or configured by higher-layer signaling.

The UE may not be aware whether a specific SF is the starting or ending SF of a DL burst. That is, the UE may attempt to receive an EPDCCH on the assumption of the starting SF and the ending SF at the same time, for every SF. Herein, the UE may assume the following EPDCCH configuration methods.

(1) First EPDCCH configuration method: both the starting and ending symbols of the EPDCCH are determined as defined by the legacy LTE-A system.

Conventionally, the starting symbol of the EPDCCH is preset or configured by RRC signaling, and has symbol index 1 to symbol index 4. That is, the starting symbol of the EPDCCH may be one of OFDM symbol 1 to OFDM symbol 4, and the ending symbol of the EPDCCH may be set to the last OFDM symbol. Additionally, an OFDM symbol with symbol index '0' may be available as the starting symbol of the EPDCCH.

(2) Second EPDCCH configuration method: the EPDCCH starts in a symbol later than a symbol determined in Method (1) (characteristically, after the starting symbol of a pSF, not defined by the LTE-A system) and ends in a symbol defined by the LTE-A system.

For example, if the starting OFDM symbol of the pSF is one of [$0^{th}$, $4^{th}$, and $7^{th}$] symbols, it may be assumed that the EPDCCH starts in the last $7^{th}$ symbol (or in the ending symbol of a PDCCH which starts in the $7^{th}$ OFDM symbol) and ends in the last OFDM symbol. The starting symbol of the EPDCCH may be pre-defined by the system or indicated to the UE by an RRC signal. Or when a set of OFDM symbols available as the starting OFDM symbol of a pSF are signaled, an OFDM symbol with a largest index in the OFDM symbol set (or the ending OFDM symbol of a PDCCH starting in the OFDM symbol with the largest index) may be determined as the starting symbol of the EPDCCH.

(3) Third EPDCCH configuration method: the EPDCCH starts in a symbol defined by the legacy LTE-A system and ends in a symbol before a symbol determined in Method (1) (i.e., a symbol before the last OFDM symbol).

Additionally, the symbol with symbol index '0' may be available as the starting symbol of the EPDCCH. The ending symbol of the EPDCCH may be set to a symbol corresponding to the minimum length of the ending SF of the DL burst, as described before. For example, if the pSF may end in the [$10^{th}$, $11^{th}$, $12^{th}$ or $14^{th}$] OFDM symbol, the $10^{th}$ OFDM symbol may be set as the ending symbol of the EPDCCH. The ending symbol of the EPDCCH may be preset or indicated to the UE by RRC signaling.

Or if a set of OFDM symbols available as the ending symbol of the pSF are signaled to the UE, the ending symbol of the EPDCCH may be determined to be an OFDM symbol with a smallest index in the OFDM symbol set. If a length (e.g., in OFDM symbols) allowed for the ending SF of the DL burst is equal to or less than a specific value (e.g., X OFDM symbols), the ending symbol of the EPDCCH may not be set for the length. For example, if the DL burst ends in the [$3^{rd}$, $6^{th}$, $9^{th}$, $10^{th}$, $11^{th}$, $12^{th}$, $13^{th}$ or $14^{th}$] OFDM symbol and X=5, the EPDCCH may be configured only with 3 OFDM symbols.

Further, among the remaining [$6^{th}$, $9^{th}$, $10^{th}$, $11^{th}$, $12^{th}$, $13^{th}$ or $14^{th}$] OFDM symbols, the ending symbol of the EPDCCH may be determined an OFDM symbol with the smallest index, the $6^{th}$ OFDM symbol.

If the set of OFDM symbols available as the ending symbol of the EPDCCH is different from the set of OFDM symbols available for the ending SF of the DL burst, an OFDM symbol of the last SF of the DL burst may be different from the ending symbol of the EPDCCH. For example, if an OFDM symbol of the last SF of the DL burst is one of the [$7^{th}$, $9^{th}$, $10^{th}$, $11^{th}$, $12^{th}$, $13^{th}$, and $14^{th}$] OFDM symbols, and the ending OFDM symbol of the EPDCCH is the [$6^{th}$, $9^{th}$, $10^{th}$, $11^{th}$, $12^{th}$, or $14^{th}$] OFDM symbol, the ending symbol of an EPDCCH in a pSF of the DL burst may be determined to be an OFDM symbol with the smallest index in the set of OFDM symbols available as the ending symbol of the EPDCCCH, the $6^{th}$ OFDM symbol.

(4) Fourth EPDCCH configuration method: either of the starting symbol and ending symbol of the EPDCCH is not defined by the legacy LTE-A system.

Then, the starting symbol and ending symbol of the EPDCCH may be determined respectively according to the EPDCCH starting symbol determination method described in (2) and the EPDCCH ending symbol determination method described in Method (3).

If the UE attempts to receive an EPDCCH on the assumption of all of the above-described four EPDCCH determination methods in order to decode an EPDCCH configurable in a DL burst (TxOP, RRP, or the like) including a pSF, the complexity of the UE may be increased significantly. Accordingly, an EPDCCH may be configured by restrictively using only a part of the four EPDCCH configuration methods. Specific embodiments of the restrictive use of EPDCCH configuration methods will be described below. The UE may attempt to detect every EPDCCH in one of the following combinations and determine an SF length based on the EPDCCH detection.

(A) If a pSF is allowed only as the first SF of a DL burst, an EPDCCH may be configured in Method (1) or both Method (1) and Method (2).

(B) If a pSF is allowed only as the last SF of a DL burst, an EPDCCH may be configured only in Method (3).

(C) If a pSF is allowed as both the first and last SFs of a DL burst, an EPDCCH may be configured in a combination of Method (1), Method (2), and Method (3), a combination of Method (1) and Method (3), a combination of Method (1) and Method (4), a combination of Method (2) and Method (3), a combination of Method (2) and Method (4), a combination of Method (3) and Method (4), only in Method (3), or only in Method (4).

(D) among the combinations of methods for configuring an EPDCCH in a pSF, the UE operates as follows in regard to a combination including Method (3) or Method (4) (i.e., the UE operates as follows to receive an EPDCCH and an ending pSF, which end in a symbol before the last OFDM symbol).

Upon detection of an EPDCCH ending before the last OFDM symbol, the UE may determine that a PDSCH in a corresponding SF ends before an SF boundary. If the EPDCCH ends in a symbol corresponding to a minimum length of the ending SF of a DL burst, the UE may determine the accurate position of the ending symbol of the DL burst, using information indicated by DCI transmitted on the EPDCCH.

For example, if the DL burst may end in the [$10^{th}$, $11^{th}$, $12^{th}$, or $14^{th}$] OFDM symbol, the EPDCCH configured in the ending pSF of the DL burst may be configured to end in the $10^{th}$ OFDM symbol. If the UE receiving the ending pSF is aware that the EPDCCH ends in the $10^{th}$ OFDM symbol by BD, the UE may determine that the PDSCH of the corresponding SF ends before an SF boundary, but may not have accurate knowledge of the ending OFDM symbol of the PDSCH among the [$10^{th}$, $11^{th}$, $12^{th}$, and $14^{th}$] OFDM symbols.

Therefore, the UE may determine the actual ending OFDM symbol of the PDSCH using information indicated by DCI transmitted on the EPDCCH. The eNB may provide the OFDM symbol information indicated by the DCI on the EPDCCH to the UE through a scrambling sequence, a CRC mask, a search space and/or a new indicator.

For example, if a 2-bit new field is defined in a DCI format, the new field may be configured to indicate the $10^{th}$ OFDM symbol with value '00', the $11^{th}$ OFDM symbol with value '01', and the $12^{th}$ OFDM symbol with value '10'. This operation may also be applicable in the same manner to a case in which there are three or more candidates as the starting OFDM symbol of a pSF in a combination including the first or second EPDCCH configuration method.

4.2.3.1 EREG Indexing Method

Now, a description will be given of an enhanced REG (EREG) indexing of REs in an EPDCCH, when self-scheduling is performed using the EPDCCH. Methods described in Section 4.2.3.1 and Section 4.2.3.2 are applied to a PStart pSF.

After the eNB indexes EREGs in the same manner as for an EPDCCH in a legacy normal SF (i.e., a full SF), the eNB may assume that symbols not transmitted in a pSF have been punctured. Or the eNB may perform new EREG indexing, starting with the actual starting symbol of the pSF.

If it is restricted that the pSF is configured in alignment with a slot boundary, especially to start at the second slot boundary of a corresponding SF, the eNB may index allocated EREGs in the same manner as for a normal SF, puncture OFDM symbols of the first slot, and map the punctured OFDM symbols to the second slot, thereby configuring the pSF.

EREGs are used to define mapping of REs of an enhanced control channel. There may exist 16 EREGs, EREG 0 to EREG 15 per PRB pair in a full SF. For antenna port p={107, 108, 109, 110} in a normal CP case or antenna port p={107, 108} in an extended CP case, all REs except DM-RS REs are cyclically mapped in an ascending order of EREG 0 to EREG 15 in a PRB pair in a frequency-first manner, and then mapped to time resources. Every RE with index i may form EREG i in the PRB pair.

In regard to frame structure type 3, if a higher-layer parameter (e.g., subframeStartPosition) indicates 's07' and a DL transmission starts in the second slot of an SF (i.e., a pSF is configured), the above-described EREG mapping methods may be applied to the second slot of the SF, instead of the first slot.

Frame structure type 3 is a new frame structure used in LAA, and 's07' indicated by the higher-layer parameter may mean that the first SF of a TxOP (DL burst or RRP) is configured as a pSF.

4.2.3.2 Setting of Minimum Aggregation Level

A method for setting a minimum aggregation level of an EPDCCH for a pSF will be described below.

A value configured for a special SF in the LTE-A system may be reused as a minimum aggregation level. For example, minimum aggregation levels may be set separately for special SF configurations 3, 4, and 8 (i.e., the number of symbols in a pSF is 11 or 12) and special SF configurations 1, 2, 6, 7, and 9 (i.e., the number of symbols in a pSF is 7, 9, or 10), in a normal CP case.

If a pSF is configured with a number of symbols (e.g., Q symbols) which is not defined in any special SF configuration, the minimum aggregation level of an EPDCCH for the pSF may be defined according to a configuration method for a special SF configuration indicating symbols of a length close to Q (a maximum length greater than Q or symbols of a minimum length larger than Q). The same rule may be readily extended to an extended CP case.

4.2.3.3 EPDCCH Monitoring SF

In the current LTE-A system, a monitoring SF for an EPDCCH is indicated to a UE on a cell basis by RRC signaling.

The UE may consider that RRC signaling of an EPDCCH monitoring SF in a UCell is valid only during a DL burst.

Or this RRC signaling may not be allowed for any of UCells (or a specific UCell). Instead, a predefined configuration for a PCell (or another cell) may be used. This rule may be applied in the same manner to a Multicast/Broadcast Single Frequency Network (MBSFN) SF defined by cross-carrier scheduling (or self-scheduling).

4.2.3.4 Zero Power CSI-RS (ZP-CSI-RS) Configuration Method

In the LTE-A system, a ZP-CSI-RS configuration for a specific EPDCCH set is indicated by RRC signaling.

In view of the nature of a DL burst that discontinuously takes place in a UCell in the LAA system, it may be difficult to periodically configure ZP-CSI-RSs. Therefore, a UE may consider that signaling of a ZP-CSI-RS configuration for a UCell is valid only during a DL burst.

Or if an aperiodic ZP-CSI-RS configuration is introduced for an EPDCCH set transmitted in a UCell, the UE may consider that ZP-CSI-RSs configured for an EPDCCH set by RRC signaling are not valid.

REs carrying ZP-CSI-RSs are rate-matched in an EPDCCH of the LTE-A system. In this case, REs carrying ZP-CSI-RSs configured by RRC signaling may not be rate-matched.

Further, it may be regulated that ZP-CSI-RS REs of an aperiodic ZP-CSI-RS configuration are rate-matched.

4.2.3.5 Starting Position of PDSCH

In the LTE-A system, when self-scheduling is performed through an EPDCCH, the starting symbol of a PDSCH is set to be identical to the starting symbol of the EPDCCH configured by higher-layer signaling. In embodiments of the present disclosure, it may be configured that the starting position of the first SF of a DL burst (or TxOP) is the $4^{th}$ OFDM symbol, and the DL burst is self-scheduled in a UCell through an EPDCCH. Then, the UE may determine that the starting symbol of a PDSCH in the first SF of the DL burst is the $4^{th}$ OFDM symbol, and the starting symbol of a PDSCH in the remaining SFs of the DL burst is different from the starting symbol of the configured EPDCCH. For example, the starting symbol of a PDSCH in an SF other than the first SF of a DL burst may be predefined as the $1^{st}$ OFDM symbol or configured by higher-layer signaling.

[Table 8] below illustrates one of methods for configuring the starting position of a PDSCH.

TABLE 8

TS 36.213>
7.1.6.4 PDSCH starting position

The starting OFDM symbol for the PDSCH of each activated serving cell is given by index $l_{DataStart}$ in the first slot in a subframe.
For a UE configured in transmission mode 1-9, for a given activated serving cell
   if the PDSCH is assigned by EPDCCH received in the same serving cell, or if the UE is configured to monitor EPDCCH in the subframe and the PDSCH is not assigned by a PDCCH/EPDCCH, and if the UE is configured with the higher layer parameter epdcch-StartSymbol-r11
     $l_{DataStart}$ is given by the higher-layer parameter epdcch-StartSymbol-r11.
   else if PDSCH and the corresponding PDCCH/EPDCCH are received on different serving cells
     $l_{DataStart}$ is given by the higher-layer parameter pdsch-Start-r10 for the serving cell on which PDSCH is received,
   Otherwise
     $l_{DataStart}$ is given by the CFI value in the subframe of the given serving cell when $N_{RB}^{DL} > 10$, and $l_{DataStart}$ is given by the CFI value + 1 in the subframe of the given serving cell when $N_{RB}^{DL} \leq 10$.

4.2.3.6 Number of EREGs in One ECCE

In the LTE-A system, for special SF configuration 1, 2, 6, 7, or 9 having a smaller number of OFDM symbols (or REs) capable of carrying an EPDCCH, the number of EREGs in an ECCE is set not to 4 but to its double, 8. For details, refer to Section 9.1.4 of 3GPP TS 36.213.

In the LAA system, even when the number of OFDM symbols (or REs) capable of carrying an EPDCCH is reduced due to transmission of a pSF, a similar operation may be performed. For example, if the number of OFDM symbols in a pSF is 11 or larger, the number of EREGs per ECCE may be set to 4, whereas if the number of OFDM symbols in a pSF is less than 11, the number of EREGs per ECCE may be set to 8.

The method for configuring the number of EREGs per ECCE is applied to PStart.

4.2.3.7 Number of EPDCC Decoding Candidates

In the LTE-A system, in case of the number of REs available for transmission of an EPDCCH in an SF is small relative to the size of DCI to be transmitted on the EPDCCH (Case 1) or in case of the number of EREGs per ECCE is 8 and thus the total number of ECCEs gets small (Case 2), the number of EPDCCH decoding candidates in a specific SF may vary. For details in regard to application of Case 1 or Case 2, refer to Section 9.1.4 of 3GPP TS 36.213.

In the LAA system, if the number of OFDM symbols in a pSF is equal to or less than a specific number (e.g., a preset value or a value indicated by higher-layer signaling), Case 1 may be applied.

Or in the case where a specific condition is satisfied as described in Section 4.2.3.5, if the number of EREGs per ECCE is always fixed to 8, Case 2 may be applied.

In the LTE-A system, the number $n_{EPDCCH}$ of REs per PRB pair in a normal SF (i.e., a full SF) is 168. If a pSF is configured to include one slot, it may have 84 REs. Even when the pSF is configured in a size larger than one slot, it is highly probable that the pSF is configured with 104 or fewer REs.

In this case, if $n_{EPDCCH} < 104$, Case 1 may be applied. For example, if $n_{EPDCCH} < 104$, the UE may decode an EPDCCH, assuming Case 1. Referring to Table(s) 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, and/or 9.1.4-5b of TS 36.213 standard document, if Case 1 is applied, EPDCCH aggregation levels "2, 4, 8, 16(, 32)" larger than "1, 2, 4, 8(, 16)" are applied. That is, the eNB may configure and transmit an EPDCCH so that an EPDCCH aggregation level may be doubled, compared to application of Case 2 or Case 3.

Therefore, if the number $n_{EPDCCH}$ of REs in a pSF is equal to or less than a predetermined number (e.g., 104) in the LAA system, the eNB may configure an EPDCCH by applying Case 1 (i.e., by increasing an EPDCCH aggregation level) and transmit the EPDCCH to a UE. When the pSF is configured, the UE may blind-decode the EPDCCH based on application of Case 1.

In another aspect of the embodiments, a different choice may be made according to the length of a pSF in the afore-described methods in Section 4.2.1 and Section 4.2.3. For example, if the length of a pSF is larger than Z symbols, the eNB may perform self-scheduling using a PDCCH, and if the length of a pSF is equal to or less than Z symbols, the eNB may perform self-scheduling using an EPDCCH.

The methods described in section 4.2.3.7 are applied to a pSF which is a PStart.

In another aspect of the embodiments, the same configuration of the starting symbol of an (E)PDCCH may be applied to a normal SF (i.e., a full SF) other than a pSF in the afore-described methods in Section 4.2.1 and Section 4.2.3. For example, a PDCCH may be configured, starting with the $5^{th}$ OFDM symbol5 ($1^{st}$ slot, l=4) of a full SF, and a PDSCH may be configured with the remaining OFDM symbols except for the PDCCH region.

4.2.3.8 Method for Restricting Scheduling Scheme

As described before in Section 4.2, if a UE is configured to be self-scheduled, when the eNB performs self-scheduling for a pSF, the eNB may indicate the position of a control channel for the pSF to the UE or the UE detects the position of the control channel. As a result, implementation complexity may be increased.

Therefore, the UE may be configured so that a pSF may be scheduled for the UE only by cross-carrier scheduling, not self-scheduling. If the eNB should perform self-scheduling at a transmission time of the pSF, the pSF may not include a PDSCH. For example, the pSF may include a dummy signal used simply to occupy a channel or may be configured only for the purpose of synchronization acquisition, AGC setting, and/or cell identification. That is, if self-scheduling is configured for the UE, the UE may not expect to receive a pSF.

4.3. Hybrid Scheduling

Hereinbelow, a description will be given of a hybrid scheduling scheme in which both cross-carrier scheduling and self-scheduling are used according to a channel environment or a system requirement.

When the first SF of a DL burst is self-scheduled in a UCell, the position of a control channel is not constant because the length of the first SF of the DL burst is variable. Therefore, self-scheduling of the first SF may be difficult from the perspective of the eNB and the UE. Further, if the number of UCells is increased, the overhead of cross-carrier scheduling in a PCell may increase significantly.

Accordingly, it may be configured that cross-carrier scheduling is applied to the first SF (or pSF) of a DL burst and self-scheduling is applied to the remaining SFs of the DL burst.

In a CA situation of the LTE-A system, the eNB indicates whether a cell is cross-carrier-scheduled or self-scheduled to the UE by RRC signaling. In contrast, in an embodiment of the present disclosure, cross-carrier scheduling may be performed for a part of one DL burst, and self-carrier scheduling may be performed for the remaining part of the DL burst. This is referred to as hybrid scheduling.

4.3.1 Pre-Scheduling

Cross-carrier scheduling that an eNB performs at the time of SF #N+1 earlier than the start of a pSF has been defined as pre-scheduling in FIG. 15. Referring to FIG. 15, a PDSCH transmitted in SF #N+1 may be scheduled in SF #N+1 of the PCell, and the other SFs may be self-scheduled in the UCell.

Even though the PDSCH is pre-scheduled at the time of SF #N+1, if the channel is not idle in SF #N+1, the eNB may pre-schedule the PDSCH again in SF #N+2 without transmitting a pSF in SF #N+1. To solve the problem, the eNB may indicate to the UE that a DL burst has actually started by additional signaling, aside from pre-scheduling.

For example, the eNB may explicitly indicate to the UE that the DL burst has started at the time of SF #N+2 in FIG. 15. More specifically, a DL burst start notification message may be transmitted to the UE in a CSS.

The UE may expect cross-carrier scheduling until before receiving the DL burst start notification message indicating the start of the DL burst, and self-scheduling until the DL burst ends, including the SF carrying the DL burst start notification message. The UE's expectation of cross-carrier scheduling or self-carrier scheduling means that the UE monitors and decodes an SS of the PCell or the UCell to decode a PDCCH and/or an EPDCCH.

The length of the DL burst may be configured for the UE by physical-layer signaling or higher-layer signaling.

In another aspect of the embodiment, the eNB may explicitly indicate the length of the first SF (e.g., pSF) of the DL burst to the UE at the time of SF #N+2 in the PCell or UCell in FIG. 15. For example, the eNB may transmit the information to the UE in a CSS.

If the length of the first SF of the DL burst is larger than W symbols, the first SF is scheduled by cross-carrier scheduling, and if the length of the first SF of the DL burst is equal to or less than W symbols, the first SF may be scheduled by self-scheduling. The UE is configured to expect cross-carrier scheduling until before receiving information about the length of the first SF of the DL burst. The UE may determine the length of the SF of the received DL burst in the CSS, and may be aware that a different scheduling scheme is applied according to an SF length. For example, if the length of the first SF of the DL burst is larger than W symbols, the UE may expect cross-carrier scheduling for the first SF and self-carrier scheduling for the remaining SFs of the DL burst. On the contrary, if the length of the first SF of the DL burst, known through a CSS is equal to or less than W symbols, the UE may expect self-scheduling for the SFs of the DL burst.

4.3.2 Post-Scheduling

Cross-carrier scheduling at a time later than the starting time of a pSF has been defined as post-scheduling with reference to FIG. 15. Transmission of a PDSCH in SF #N+1 may be scheduled in SF #N+2 of a PCell, and the remaining SFs may be scheduled by self-scheduling in a UCell.

Similarly to Section 4.3.1, the eNB may explicitly indicate to the UE that a DL burst has actually started by signaling, aside from post-scheduling. The UE may expect both cross-carrier scheduling in the PCell and self-scheduling in the UCell. Upon receipt of a message indicating the start of the DL burst in the PCell, the UE may expect only self-scheduling in the UCell, not cross-carrier scheduling in the PCell, from the next SF till the end of the DL burst. The length of the DL burst may be configured by physical-layer signaling or higher-layer signaling.

4.3.3 Hybrid Scheduling for Specific UCell

A UE may be configured to always expect both cross-carrier scheduling and self-scheduling for a specific UCell.

In the scheduling methods described in Section 4.3.1, 4.3.2, or 4.3.3, the eNB may be configured to always perform cross-carrier scheduling and/or self-carrier scheduling for a specific UCell. Further, the eNB may be configured to always perform cross-carrier scheduling and/or self-carrier scheduling, starting from a determined time (or during a determined time period).

4.3.4 Search Space

In the hybrid scheduling methods described in Section 4.3, it has been assumed that a scheduling grant for one UCell may be transmitted in one or more of a plurality of UCells at a specific time point. For example, from the viewpoint of a specific UE, the UE may expect that a scheduling grant for UCell1 will be transmitted from the eNB at a time of SF #N in UCell1 as well as a PCell. Or the UE may expect that the scheduling grant for UCell1 will be transmitted from the eNB at a time of SF #N in UCell2 as well as the PCell. Hereinbelow, a description will be given of methods for configuring a PDCCH search space and PDCCH BD methods of a UE in an environment in which one UCell may be scheduled by a plurality of cells.

A PDCCH search space for scheduling of a scheduled cell may be configured simultaneously in all of a plurality of scheduling cells that schedule other cells. Further, the UE may attempt PDCCH BD to detect scheduling information for the scheduled cell, at the same time in the search spaces of the plurality of scheduling cells. The number of BDs performed for the specific scheduled cell by the UE may be determined as follows.

If the number of BDs for a specific scheduled cell is N and the number of scheduling cells is K (>1) in the LTE-A system, the UE may set the number of BDs for the scheduled cell to a value larger than N. For example, the UE may set the number of BDs for the scheduled cell to K×N. Or given a plurality of scheduling cells, the UE may set the number of BDs for the scheduled cell to a value equal to or less than N, in consideration of UE implementation complexity that increases with an increase in the number of BDs for the specific scheduled cell.

In another aspect of the embodiments, a method for maintaining the number of BDs to be N in spite of a plurality of scheduling cells will be described below.

The simplest method is to equally divide the number of BDs between a scheduling cell(s). For example, if there are two scheduling cells, the number of BDs for each scheduling cell may be set to 2/N. When this method is applied, the number of BDs per Aggregation Level (AL) may be set equally between the plurality of scheduling cells. For example, if the numbers of BDs are {6, 6, 2, 2} respectively for ALs {1, 2, 4, 8} and K=2, the numbers of BDs per AL may be set to {3, 3, 1, 1} for each scheduling cell.

Or the number of BDs may be set unequally between a scheduling cell(s). For example, a larger number of BDs may be set for a scheduling cell having a large system bandwidth, or for a scheduling cell (PCell) in a licensed band. For example, if the numbers of BDs are {6, 6, 2, 2} respectively for ALs {1, 2, 4, 8} and K=2, the numbers of BDs per AL may be set to {4, 4, 2, 2} for the scheduling cell having the large system bandwidth or the scheduling cell of the licensed band, and the numbers of BDs per AL may be set to {2, 2, 0, 0} for the other scheduling cells. This may be interpreted as setting a larger number of BDs at a higher AL for a scheduling cell having a large system bandwidth or a scheduling cell in a licensed band.

If there are a plurality of scheduling cells and the total number of BDs is set to M larger or smaller than N, the number M of DBs may be set equally or unequally between the scheduling cells according to the above proposed methods.

Now, a description will be given of a method for allocating a number of BDs, when all or a part of a plurality of scheduling cells are TDD cells in another aspect of the embodiment of the present disclosure.

According to a TDD DL/UL configuration, the number of scheduling cells having DL SFs at a specific time may be 1 or more. If the number of scheduling cells having DL SFs at a specific time is K, the UE may set the number of BDs for the scheduled cell to K×N.

Or even though the number of scheduling cells having DL SFs at a specific time is changed, the UE may set the number of BDs to be constant all the time. For example, if one scheduling cell has a DL SF at a specific time, the UE may perform N BDs in the scheduling cell. If two or more scheduling cells have DL SFs at a specific time, the UE may divide the number of BDs between the scheduling cells according to the proposed method, while maintaining the total number of BDs to be N.

Or in order to reduce the complexity of setting the number of BDs according to the number of scheduling cells having DL SFs at a specific time, SFs in which a plurality of scheduling cells are allowed may be limited to SF #0, SF #1, SF #5, and SF #6. That is, a plurality of scheduling cells may be allowed only in SFs always configured as DL SFs in the TDD DL/SL configurations of the current LTE-A system, and only self-scheduling may be allowed for the remaining SFs.

A scheduling grant for a specific scheduled cell may be transmitted in a plurality of scheduling cells, for UL transmission as well as DL transmission. Herein, a PHICH for PUSCH transmission on the scheduled cell may be transmitted in a scheduling cell carrying a scheduling grant for a PUSCH among the plurality of scheduling cells.

4.4. Method for Measuring and Reporting CSI for pSF

Validity for measuring CSI in a pSF will be described below. The following embodiments may be applied alone or in combination, when the scheduling methods described in Section 4.1 to Section 4.3 are performed.

4.4.1 Setting of Validity According to SF Type

In regard to a variable pSF length, a mismatch may occur between a UE and an eNB. If a pSF is set as a CSI reference resource, the UE may feed back a wrong CSI value to the eNB due to the mismatch of pSF length information between the UE and the eNB. To avert the problem, a pSF may not be regarded as a valid DL SF. Only a normal SF may be regarded as a valid DL SF.

For example, the eNB may not allocate CSI-RS resources to a pSF, and the UE does not use the pSF as a reference resource for CSI measurement and reporting, because it does not regard the pSF as a valid SF. Consequently, the UE may measure CSI only in a normal SF included in a DL burst (TxOP, RRP, or the like) and report the CSI measurement to the eNB, periodically or aperiodically. Needless to say, the UE may report a previous CSI measurement to the eNB in spite of the absence of a DL burst in a CSI reporting period.

In Section 4.4.1, a pSF may be a PStart pSF with some first OFDM symbols empty or a PEnd pSF with some last OFDM symbols empty.

4.4.2 Setting of Validity According to pSF Length

In view of the nature of an unlicensed band which eNBs randomly access by contention, a specific eNB may occupy the band at a low rate. If a pSF is excluded from valid DL SFs in this situation, the number of CSI reference resources available to a UE is not large, and thus the UE may not accurately measure and report a CQI. In this context, a pSF may be regarded as a valid DL SF.

D-2a) The validity of a pSF may be determined according to the length of the pSF. For example, only if the pSF is longer than 7680 Ts, the pSF may be considered to be a valid DL SF. 7680 Ts is a minimum unit of a special SF defined in the LTE-A system.

D-2b) Whether the starting pSF (or ending pSF) of a DL burst is supported may be configured as UE capabilities (and/or eNB capabilities). The eNB may determine that the starting pSF (or ending pSF) is valid only for a UE that has transmitted UE capability signaling indicating that the UE is capable of receiving a starting pSF (or ending pSF) and/or a UE that has received eNB capability signaling.

The pSF may be configured in the starting and/or ending SF of a DL burst. The methods described in Section 4.4.1 and Section 4.4.2 may be applied to the ending SF of a DL burst as well as the starting SF of the DL burst.

4.5. Floating TTI

A floating TTI structure will be described. As illustrated in the example of FIG. 20, even though an eNB completes an LBT operation (CCA or CS operation) at a time other than an SF boundary, an SF of a full size other than a pSF may always be configured. For example, the eNB may transmit an SF, while always maintaining a TTI of about 1 ms. This may be defined as a floating TTI structure.

4.5.1 Restriction of Starting Position

Figure 21:
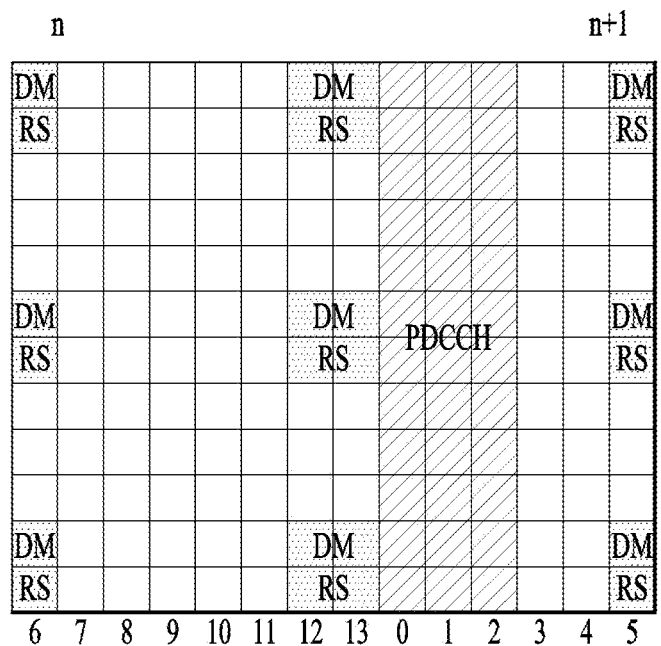
FIG. 21 is a view illustrating a method for, when a floating Transmission Time Interval (TTI) is configured, restricting the starting position of the floating TTI.

As stated before in Section 4.2.2, if a PDCCH is longer than one OFDM symbol, it may be necessary to limit the starting position of a floating TTI. Regarding a UE using a TM in which PDSCH decoding is attempted based on DM-RSs, if a floating TTI is transmitted to the UE as illustrated in FIG. 21, the UE may have an error in channel estimation based on DM-RSs. FIG. 21 is a view illustrating a method for restricting the starting position of a floating TTI, when the floating TTI is configured.

For example, if DM-RSs are multiplexed along the time axis in Code Division Multiplexing (CDM), channel information may mismatch between two DM-RSs in a structure in which DM-RSs are apart from each other by about 1 ms, not residing in contiguous OFDM symbols, as illustrated in FIG. 21. As a result, orthogonality may not be ensured, thereby degrading the channel estimation performance of the UE.

To solve the problem, the starting position of a floating TTI may be restricted so that DM-RSs may be transmitted in contiguous OFDM symbols. For example, it may be configured that a floating TTI should not start in the 6th OFDM symbol and the $13^{th}$ OFDM symbol in FIG. 21. In FIG. 21, the $6^{th}$ OFDM symbol to the $13^{th}$ OFDM symbol are included in SF #n, and the $0^{th}$ OFDM symbol to the $5^{th}$ OFDM symbol are included in SF #n+1.

In another aspect of the embodiment, the starting position of a floating TTI may be restricted in a certain SF, in consideration of the buffering capability of a UE. In the structure of the floating TTI, buffering on a minimum transmission unit (e.g., 1 ms) basis is needed in UEs. However, some UE may not support 1-ms buffering. For example, considering UEs that support only 1-slot buffering, the starting position of a floating TTI may be restricted to after the first or second OFDM symbol.

4.5.2 Length of Last Floating TTI of DL Burst

Figure 22:
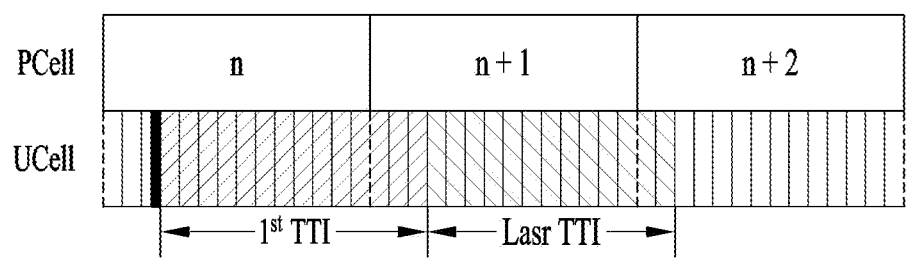
FIG. 22 is a view illustrating one of methods for configuring the length of the last floating TTI of a downlink burst.

If the ending time of an LBT operation of the eNB does not accurately match an OFDM symbol boundary, the eNB may transmit a reservation signal from the time until the next OFDM symbol boundary. Further, if a transmission node occupies a channel once, a maximum occupancy time may be limited. FIG. 22 is a view illustrating one of methods for setting the length of the last floating TTI of a DL burst.

As illustrated in FIG. 22, it is assumed that after the eNB starts to transmit a reservation signal for channel occupation, in the middle of the third OFDM symbol of SF #n, a floating TTI starts in the fourth OFDM symbol and a maximum time available for channel occupation of a transmission node is 2 ms. Herein, the last OFDM symbol of the last TTI (e.g., the third OFDM symbol of SF #n+2) may not be transmitted.

If the starting position of a floating TTI is restricted as described in Section 4.5.1, a reservation signal may be longer than one OFDM symbol. Then, the last floating TTI of the DL burst may be shorter than the TTI illustrated in FIG. 21.

If the UE is capable of determining that the floating TTI is the last floating TTI of the DL burst by higher-layer signaling or physical-layer signaling, the eNB preferably indicates the number of OFDM symbols (or the position of the ending OFDM symbol) of the last TTI as well as the position of the starting OFDM symbol of the last TTI.

On the other hand, if the UE is not capable of determining that the floating TTI is the last floating TTI of the DL burst, the eNB preferably indicates the number of OFDM symbols (or the position of the ending OFDM symbol) of a TTI as well as the position of the starting OFDM symbol of the TTI, in a scheduling grant for each floating TTI.

Only if a reservation signal is configured with a sequence known to the eNB and the UE, and the UE is aware of the number of floating TTIs in a DL burst by higher-layer signaling or physical-layer signaling, the UE may implicitly determine the length of the last floating TTI of the DL burst.

For example, if the reservation signal is received across two OFDM symbols and the UE is aware that a DL burst includes two floating TTIs, upon receipt of a scheduling grant in the second floating TTI, the UE may perform decoding on the assumption that the floating TTI includes 12 OFDM symbols, not 14 OFDM symbols.

4.5.3 Method for Transmitting EPDCCH in Floating TTI

A UE self-scheduled through a PDCCH may determine the starting position of a floating TTI from a PDCCH that always starts from the first OFDM symbol of an SF.

However, since the starting symbol of an EPDCCH may not be constant in a floating TTI, a UE self-scheduled through an EPDCCH should perform EPDCCH decoding with respect to all starting position candidates in order to successfully receive the EPDCCH. As a result, the implementation complexity of the UE increases significantly.

To avert the problem, the eNB may indicate the starting position of an EPDCCH to a UE, using a CSS of a PCell in an embodiment of the present disclosure. Or as described in Section 4.5.2, the eNB may also explicitly indicate the ending position of the EPDCCH to the UE in consideration of a variable ending position of the last TTI.

4.6 Method for Configuring PDCCH Region and Starting Symbol of PDSCH 4.6.1 Method for Configuring PDCCH Region If a PCFICH is not defined in a UCell, a PDCCH region in the UCell may be configured for a UE by higher-layer signaling. The configured value may be applied to self-carrier scheduling and/or cross-carrier scheduling. Or the configured value may be applied UE-specifically or cell-specifically.

The starting symbol of a PDSCH may be determined according to the PDCCH region configured by higher-layer signaling. For example, in the case where the PDCCH region is configured to include two OFDM symbols and the starting position of a pSF is set to the $0^{th}$ OFDM symbol or the $3^{rd}$ OFDM symbol, the UE may assume that if the pSF starts in the $0^{th}$ OFDM symbol, the PDSCH starts in the $2^{nd}$ OFDM symbol, and if the pSF starts in the $3^{rd}$ OFDM symbol, the PDSCH starts in the $5^{th}$ OFDM symbol.

4.6.2 Configuration of Starting Symbol of PDSCH

The starting symbol of a PDSCH in a DL burst may be configured for the UE by higher-layer signaling. The configured value may be applied to self-carrier scheduling and/or cross-carrier scheduling. The configured value may also be UE-specific or cell-specific. A plurality of values may be available as the starting symbol of the PDSCH according to the starting position of a pSF, and the PDCCH region may be implicitly determined according to the starting symbol of the PDSCH. For example, if the starting symbol of the PDSCH is set to the $3^{rd}$ OFDM symbol, the UE may assume that in spite of the absence of a PCFICH, the PDCCH region includes three OFDM symbols, the $0^{th}$ OFDM symbol to the $2^{nd}$ OFDM symbol.

4.6.3 Higher-Layer Signaling Method

Both the PDCCH region and the starting symbol of the PDSCH may be configured by higher-layer signaling. The configured values may be applied to self-carrier scheduling and/or cross-carrier scheduling. All of the configured values may be UE-specific or cell-specific. Or a part of the values may be UE-specific, and the other part may be cell-specific. Herein, it may be restricted that the starting symbol of the PDSCH is configured only after the PDCCH region. Or the UE may not expect signaling of a PDCCH region and the starting symbol of a PDSCH, overlapped with each other.

4.7 Operations of eNB and UE, for Operating pSF

As described before, a UE may operate in a different manner depending on how an eNB applies pSF structures. For the convenience of description, a pSF with some first OFDM symbols empty is defined as 'PStart', a pSF with some last OFDM symbols empty is defined as 'PEnd', and a normal SF is defined as 'Full', among SFs of a DL burst in embodiments of the present disclosure.

Further, a DL burst may be referred to as a DL Tx burst, interchangeably used with a TxOP or an RRP. Herein, the DL burst may cover a transmission period of a reservation signal in concept.

4.7.1 G1) Method for Operating Only PStart and Full

The eNB may operate only PStart and Full, and set a different PStart length according to the type of a UE to be scheduled as follows.

G1-A) A cross-carrier-scheduled UE may expect scheduling only in Full.

G1-B) A UE configured to be self-scheduled through a PDCCH may expect scheduling in both PStart and Full. Any OFDM symbol is available as the starting OFDM symbol of PStart, and the starting OFDM symbol of PStart may be restricted to some OFDM symbols. For example, it may be restricted that PStart should start only in the $5^{th}$ OFDM symbol carrying second CRS antenna port 0. Or it may be restricted that PStart should start only at a second slot boundary.

The UE may determine an actual starting time of PStart depending on whether CRS and/or PDCCH decoding is successful. Or the UE may determine the starting time of PStart according to the position of a preamble (or initial signal) and/or a sequence.

G1-C) A UE configured to be self-scheduled through an EPDCCH may expect scheduling of both PStart and Full. Or whether an EPDCCH can be decoded in PStart is defined as a UE capability, and thus the eNB may schedule only a UE from which the eNB has received signaling indicating that the UE is capable of decoding an EPDCCH in PStart, through a PStart EPDCCH. Or the eNB may indicate to each UE (or cell-commonly) whether scheduling is performed through an EPDCCH in PStart by higher-layer signaling (e.g., RRC signaling). Or an EPDCCH may not be configured to be supported in PStart. The starting OFDM symbol of PStart may be restricted as in G1-B), and the starting OFDM symbol of a UE corresponding to G1-B) may be different from the starting OFDM symbol of a UE corresponding to G1-C).

For example, if the starting OFDM symbol of a UE corresponding to G1-B) corresponds to a second slot boundary, and the starting OFDM symbol of a UE corresponding to G1-C) is the third OFDM symbol, the eNB may determine whether to apply G1-B) or G1-C) depending on the type of a scheduled UE or the ending time of an LBT operation.

In Method G1-C), it may be determined in one of the following methods whether a UE is for PStart or Full.

(1) Method 1: The eNB may indicate the type of an SF to the UE by explicit signaling. Two or more EPDCCH sets may be configured for the UE. In the case of a short EPDCCH, the UE may not determine whether an SF is Full or PStart. Therefore, the eNB may explicitly indicate whether the SF is Full or PStart and/or the size of the SF.

(2) Method 2: One of the two EPDCCH sets is preset for the usage of PStart and the other EPDCCH set is preset for the usage of Full. Thus, the UE may determine whether the SF is PStart or Full depending on a decoded EPDCCH set.

(3) Method 3: The UE may determine whether the SF is Full or PStart by BD. For example, if PStart EPDCCHs (relatively short EPDCCHs) and Full EPDCCHs (relatively long EPDCCHs) are preset respectively in the two EPDCCH sets, the UE may determine whether the SF is Full or PStart according to the length of a successfully decoded EPDCCH.

(4) Method 4: The UE may determine from a preamble transmitted in a DL burst whether an SF is Full or PStart. For example, if PStart EPDCCHs (relatively short EPDCCHs) and Full EPDCCHs (relatively long EPDCCHs) are preset respectively in the two EPDCCH sets, the UE may determine whether the SF is Full or PStart according to the position of a preamble and/or a preamble sequence.

4.7.2 DM-RS Pattern Allocated to PStart

A description will be given of a method for configuring DM-RSs and an EPDCCH, when PStart includes 7 OFDM symbols.

Figure 23:
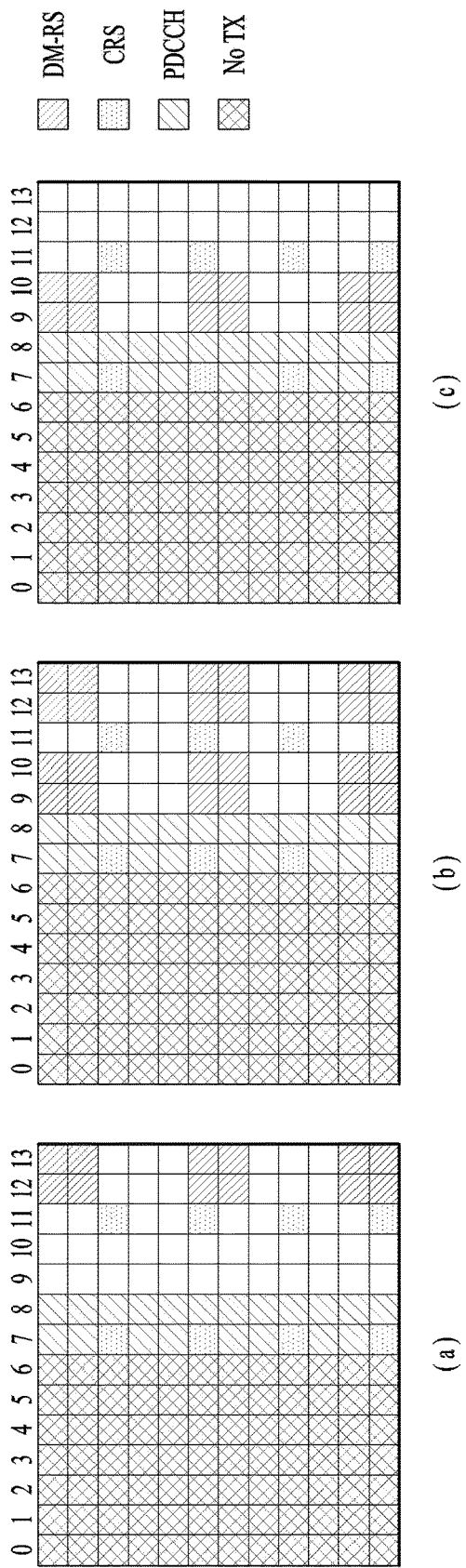
FIG. 23 is a view illustrating a method for configuring Demodulation Reference Signals (DM-RSs) and an EPDCCH in PStart.

FIG. 23 is a view illustrating a method for configuring DM-RSs and an EPDCCH in PStart.

If PStart is configured for a UE, a DM-RS pattern may be configured as one of FIGS. 23(a), (b), and (c). While a CRS pattern as configured in the LTE-A system may still be used, one of FIGS. 23(a), (b), and (c) may be applied as the DM-RS pattern.

In PStart, the starting position of an EPDCCH may be one of the $8^{th}$, $9^{th}$, and $10^{th}$ OFDM symbols in FIG. 23, and the ending position of the EPDCCH may be one of the $12^{th}$ and $13^{th}$ OFDM symbols in FIG. 23. In consideration of the transmission efficiency of a PDSCH to the UE, PStart may be configured not to include DM-RSs and/or CSI-RSs/CSI-IM.

4.7.3 G2) Method for Operating Only Full and PEnd

Methods for operating only Full and PEnd will be described below.

G2-A) A cross-carrier-scheduled UE may expect scheduling of both Full and PEnd. Herein, additional signaling may be needed for an indicator indicating whether an SF is PEnd or an indicator indicating the length of PEnd. For example, the indicator indicating whether an SF is PEnd (or indicating the length of PEnd) may be transmitted on a PDCCH.

G2-B) A UE configured to be self-scheduled by a PDCCH may expect scheduling of both Full and PEnd. Herein, additional signaling may be needed for an indicator indicating whether an SF is PEnd or an indicator indicating the length of PEnd. For example, the indicator indicating whether an SF is PEnd (or indicating the length of PEnd) may be transmitted to the UE by a common signal in a PCell or on a PCFICH or PDCCH in an LAA SCell.

G2-C) A UE configured to be self-scheduled by an EPDCCH may expect scheduling of only Full. Or the UE may expect scheduling of both Full and PEnd. Or in the case where whether an EPDCCH can be decoded in PEnd is defined as a UE capability, the eNB may schedule only a UE from which the eNB has received signaling indicating that the UE is capable of decoding an EPDCCH in PEnd, through a PEnd EPDCCH. Or the eNB may indicate to each UE (or cell-commonly) whether scheduling is performed in PEnd through an EPDCCH by higher-layer signaling (e.g., RRC signaling).

It may be determined in one of the following methods whether an SF is PEnd or Full.

(1) Method 1: the eNB may indicate whether an SF is Full or PEnd to the UE by a common signal in the PCell or on a PCFICH in the LAA SCell. For example, the UE may attempt to decode an EPDCCH set configured for the usage of PEnd. Or the UE may be aware that an SF is PEnd by a common signal in the PCell or on a PCFICH in the LAA SCell. This UE may be configured to perform PDCCH decoding (not EPDCCH decoding) in the SF.

(2) Method 2: The eNB may indicate by explicit signaling. That is, the eNB may explicitly indicate whether an SF is Full or PEnd or the size of the SF.

(3) Method 3: One of two EPDCCH sets is preset for the usage of PEnd, and the other EPDCCH set is preset for the usage of Full. Thus, the UE may determine whether an SF is PEnd or Full depending on a decoded EPDCCH set.

(4) Method 4: The UE may determine whether an SF is Full or PEnd by BD. For example, if Full EPDCCHs (relatively long EPDCCHs) and PEnd EPDCCHs (relatively short EPDCCHs) are preset respectively in the two EPDCCH sets, the UE may determine whether the SF is Full or PEnd according to the length of a successfully decoded EPDCCH.

(5) Method 5: The eNB may configure EPDCCHs according to DM-RS patterns. For example, if PEnd is configured in the structure of a DwPTS being a special SF, four DM-RS patterns may be configured according to the lengths of PEnd as illustrated in FIG. 24. FIG. 24 is a mere example. Thus, any other special SF structure may be used or a new DM-RS pattern may be configured.

In Method 5, the eNB may configure an EPDCCH to end in an OFDM symbol with a minimum index among the ending OFDM symbols of DwPTSs supporting respective DM-RS patterns. For example, if 11 to 13 OFDM symbols are included in the ending pSF of a DL burst, a DM-RS pattern as illustrated in FIG. 24(b) may be used. If a DwPTS includes 11 OFDM symbols in the LTE-A system (Rel-12), an EPDCCH configuration (e.g., number of EREGs per ECCE, supported EPDCCH formats, EPDCCH candidates monitored by a UE, and so on) defined by DwPTS configuration 3 or 8 may be used.

In another example of Method 5, if the ending pSF (PEnd) of a DL burst includes 9 to 10 OFDM symbols, a DM-RS pattern as illustrated in FIG. 24(c) may be used. If a DwPTS includes 9 OFDM symbols in the legacy Rel-12 LTE-A system, an EPDCCH configuration defined by DwPTS configuration 1 or 6 may be used.

In another example of Method 5, if PEnd of a DL burst includes 6 to 8 OFDM symbols, a DM-RS pattern as illustrated in FIG. 24(d) may be used. If a DwPTS includes 6 OFDM symbols in the legacy Rel-12 LTE-A system, an EPDCCH configuration defined by DwPTS configuration 9 may be used.

The eNB may configure as many EPDCCH sets as the number of predetermined DM-RS patterns (or fewer EPDCCH sets than the number of predetermined DM-RS patterns), and the UE may determine a DM-RS pattern according to a decoded EPDCCH set.

Or the eNB may configure up to two EPDCCH sets for each DM-RS pattern (or some DM-RS patterns), and the UE may attempt to decode appropriate EPDCCH sets according to a DM-RS pattern determined by explicit signaling or BD.

When the UE attempts EPDCCH decoding (or DM-RS BD) for four DM-RS pattern candidates in each SF, as illustrated in FIG. 24, UE implementation complexity may be very large. To solve the problem, at least one of the following proposed methods may be used.

(A) Method 5-1: Combination with common signaling indicating Full SF or pSF.

If a UE determines that an SF is a Full SF by common signaling, the UE assumes the DM-RS pattern illustrated in FIG. 24(a). If the UE determines that the SF is a pSF by common signaling, the UE detects which DM-RS pattern is transmitted among the DM-RS patterns illustrated in FIGS. 24(b), (c), and (d), and thus may decode PEnd.

(B) Method 5-2: Combination with common signaling indicating DM-RS pattern

If the UE detects a DM-RS pattern of an SF by common signaling, the UE may assume a specific DM-RS pattern illustrated in FIG. 24(a), (b), (c), or (d), and attempt to decode an EPDCCH set corresponding to each DM-RS pattern.

For example, if transmission of the DM-RS pattern illustrated in FIG. 24(b) is indicated to the UE by common signaling, the UE may decode an EPDCCH set(s) in which an EPDCCH ending symbol is set to the $11^{th}$ OFDM symbol (or an OFDM symbol with a lower index).

(C) Method 5-3: Combination with common signaling indicating the number of OFDM symbols in SF.

If the UE is aware of the ending OFDM symbol of an SF by common signaling, the UE may decode EPDCCH sets configured to end in the OFDM symbol, to end earlier than the OFDM symbol, and/or to end in the last place among EPDCCH sets configured to end earlier than the OFDM symbol.

(D) Method 5-4: Exclusion of specific DM-RS pattern.

It may be pre-configured that some DM-RS patterns should not be used in SCells of the LAA system. Or it may be configured by higher-layer signaling that a specific UCell or a specific UE should not use some DM-RS patterns.

For example, if a pSF of a DwPTS structure with 6 OFDM symbols is not allowed in a specific UCell or for a specific UE in the LAA system, it may be pre-configured that the DM-RS pattern illustrated in FIG. 24(d) should not be used. That is, the UE may be configured not to assume the DM-RS pattern for decoding.

In another example, the UE may be configured to decode even a Full SF on the assumption of the DM-RS pattern illustrated in FIG. 24(b) or (c).

In another example, if a pSF includes 11 to 13 OFDM symbols, it may be configured that not the DM-RS pattern illustrated in FIG. 24(b) but the DM-RS pattern illustrated in FIG. 24(c) is used.

(E) Method 5-5: modification of specific DM-RS pattern.

An LAA SCell may not support a DwPTS structure including 6 OFDM symbols. Instead, a new DwPTS structure with 7 OFDM symbols may be introduced. For a corresponding DwPTS, the DM-RS pattern illustrated in FIG. 24(c) may be assumed.

Or if the DM-RS pattern illustrated in FIG. 24(d) is used, a DM-RS sequence different from a legacy DM-RS sequence may be used. For example, one of pseudo-random sequence generator parameters for initializing a DM-RS scrambling sequence illustrated in FIG. 24(d), $n_s$ may be set to a value (e.g., a predefined or configured offset value $+n_s$) other than 0 to 19, or a specific value may be pre-configured as $N_{ID}^{cell}$ (or $n_{ID,i}$EPDCCH) by higher-layer signaling. The eNB and/or the UE may determine whether an SF is Full or PEnd based on a specific DM-RS pattern configured in this manner.

4.7.4 G3) Method for Operating All of PStart, Full, and PEnd

G3-A) A cross-carrier-scheduled UE may expect to be scheduled only in Full or PEnd as in Method G2-A).

G3-B) A UE configured to be self-carrier-scheduled by a PDCCH may expect to be scheduled only in PStart and Full as in Method G1-B). Or the UE may expect to be scheduled only in Full or PEnd as in Method G2-B). Or the UE may expect to be scheduled in all of PStart, Full, and PEnd.

The UE may perform CRS and/or PDCCH decoding at an SF boundary. If the UE succeeds in the decoding, the UE may determine whether an SF is Full or PEnd by DCI (or a PCFICH).

On the contrary, if the UE fails in decoding at the SF boundary, the UE may perform additional CRS and/or PDCCH decoding in the starting OFDM symbol of PStart. If the UE succeeds in the CRS and/or PDCCH decoding, the UE may determine that PStart has started.

In another example, when determining that an SF has started at an SF boundary by the position of a preamble and/or a preamble sequence, the UE may perform CRS and/or PDCCH decoding at the SF boundary. If the UE succeeds in the decoding, the UE may determine whether the SF is Full or PEnd by DCI (or a PCFICH).

If the UE determines PStart by the position of the preamble and/or the sequence, the UE may perform additional CRS and/or PDCCH decoding in the starting OFDM symbol of PStart. If the UE succeeds in the decoding, the UE may determine that PStart has started.

G3-C) A UE configured to be self-carrier-scheduled by an EPDCCH may expect to be scheduled only in PStart and Full as in Method G1-C). Or the UE may expect scheduling of only Full and PEnd as in Method G2-C). Or the UE may expect scheduling of all of PStart, Full, and PEnd. Or whether an EPDCCH can be decoded in PStart and/or PEnd is defined as a UE capability, and thus the eNB may schedule only a UE from which the eNB has received signaling indicating that the UE is capable of decoding an EPDCCH in PStart and/or PEnd, through a PStart and/or PEnd EPDCCH. Or the eNB may indicate UE-specifically and/or UCell-commonly whether scheduling is performed through an EPDCCH in PStart and/or PEnd by higher-layer signaling.

Or it may be restricted that an EPDCCH should be supported in one of PStart and PEnd or in a Full SF, rather than the EPDCCH is supported in both PStart and PEnd, from the viewpoint of a specific UE. The UE may determine whether an SF is PStart, Full, or PEnd in one of the following methods.

(A) Method 1: the UE may first determine whether an SF is Full or PEnd by common signaling in the PCell or a PCFICH in the LAA SCell. If the SF is PEnd, (A) Method 1 of G2-2C) may be applied. If determining that the SF is not either Full or PEnd, the UE may apply (A) to (D) Method 4 of G1-C), assuming that the SF is PStart.

(B) Method 2: the eNB may indicate the type of an SF to the UE by explicit signaling. For example, only the fourth of the proposed four EPDCCH types (i.e., an EPDCCH format with some first OFDM symbols and some last OFDM symbols empty) is allowed, and the eNB may indicate whether the SF is PStart, Full, or PEnd or indicate the length of the SF, by the EPDCCH.

(C) Method 3: Three EPDCCH sets may be defined in the system, and the usage of each EPDCCH set may be preset. The UE may determine whether an SF is PStart, Full, or PEnd according to a decoded EPDCCH set.

(D) Method 4: Combination of Explicit Signaling and Implicit Signaling i) Method 4A: One of two EPDCCH sets may be set for the usage of Full and the other may be set for the usage of PStart or PEnd in the system. The eNB may indicate whether an SF is PStart or PEnd or indicate the length of the SF, by an EPDCCH.

ii) Method 4B: One of two EPDCCH sets may be set for the usage of PStart and the other may be set for the usage of Full or PEnd in the system. The eNB may indicate whether an SF is Full or PEnd or indicate the length of the SF, by an EPDCCH.

iii) Method 4C: One of two EPDCCH sets may be set for the usage of PEnd and the other may be set for the usage of Full or PStart in the system. The eNB may indicate whether an SF is Full or PStart or indicate the length of the SF, by an EPDCCH.

iv) Method 4D: One of two EPDCCH sets may be set for the usage of Full/PStart and the other may be set for the usage of Full/PEnd in the system. The eNB may indicate whether an SF is Full/PStart or Full/PEnd by an EPDCCH. Or the eNB may additionally indicate the length of the SF by each EPDCCH.

v) Method 4E: One of three EPDCCH sets may be set for the usage of Full, another may be set for the usage of Full/PStart, and the other may be set for the usage of Full/PEnd in the system. The eNB may indicate whether an SF is Full/PStart or Full/PEnd by each EPDCCH. Or the eNB may additionally indicate the length of the SF by each EPDCCH.

vi) Method 4F: One of three EPDCCH sets may be set for the usage of Full, another may be set for the usage of Full/PStart, and the other may be set for the usage of PEnd in the system. The eNB may indicate whether an SF is Full or PStart or indicate the length of the SF, by an EPDCCH.

vii) Method 4G: One of three EPDCCH sets may be set for the usage of Full, another may be set for the usage of PStart, and the other may be set for the usage of PEnd in the system. The eNB may indicate whether an SF is Full or PEnd or indicate the length of the SF, by an EPDCCH.

4.7.5 Method for Indicating Type of SF by EPDCCH

In the methods proposed in Section 4.7.1, Section 4.7.3, and Section 4.7.4, the eNB may indicate the type of an SF to the UE by adding a new field to an EPDCCH. For example, the new field may indicate whether an SF is (1) PStart or Full, (2) Full or PEnd, or (3) PStart, Full, or PEnd.

Further, the eNB may indicate the length of an SF to the UE by defining a new field transmitted on an EPDCCH.

In another method, for a self-carrier-scheduled UE or a UE for which PUCCH format 3 transmission is configured to feed back a PUCCH HARQ-ACK, the eNB may borrow HARQ-ACK Resource Offset (ARO) fields included in a DCI format of the LTE-A system to indicate the type of an SF. That is, upon receipt of an ARO, the UE may determine the type of an SF, not original information indicated by the ARO.

In another method, for a cross-carrier scheduled UE for which PUCCH format 1a/1b is configured for channel selection to feed back a PUCCH HARQ-ACK, the eNB may borrow a Transmit Power Control (TPC) field included in a DCI format to indicate the type of an SF.

In another method, an ARO field for a self-carrier scheduled UE or a UE for which PUCCH format 3 transmission is configured to feed back a PUCCH HARQ-ACK, or a TPC field for a cross-carrier scheduled UE for which PUCCH format 1a/1b is configured for channel selection to feed back a PUCCH HARQ-ACK, may be used for another usage.

For example, the eNB may indicate an RS power value (a power ratio of data to an RS or a data power value) of an SF (or a DL Tx burst) to a UE. In another example, the eNB may indicate to the UE whether a discovery RS is transmitted in an SF and/or indicate a PDSCH rate matching pattern.

4.7.6 EPDCCH Search Space and BD

In regard to an EPDCCH (refer to Sections 4.7.1, 4.7.3, and 4.7.4) in the proposed Methods G1) to G3), a UE may be configured to perform BD separately on an EPDCCH set candidate basis so that the UE may not be required to perform more BDs than defined for an EPDCCH search space by the legacy LTE system.

When EPDCCHs for the usage of Full (relatively long EPDCCHs) and EPDCCHs for the usage of pSF (relatively short EPDCCHs) are configured in the system as in Method 3/4 of G1-C) and Method 4/5 of G2-C) and the UE determines whether an SF is a full SF or a pSF depending on the length of a successfully decoded EPDCCH, this method may be applied.

More specifically, if the number of BDs that a UE performs in a search space for an EPDCCH in the legacy LTE system is N, the UE may be configured to perform N BDs for EPDCCHs for the usage of Full (relatively long EPDCCHs) and N BDs for EPDCCHs for the usage of pSF (relatively short EPDCCHs). However, this case may increase UE implementation complexity.

To avert the problem, the UE may be configured to maintain the total number of BDs performed to detect an EPDCCH for the usage of Full and BDs performed to detect an EPDCCH for the usage of pSF to be N.

For example, the UE may be configured to equally perform N/2 BDs for the EPDCCHs for Full and the EPDCCHs for pSF. In another example, the UE may be configured to perform more BDs for the EPDCCHs for Full than the EPDCCHs for pSF, or vice versa.

4.7.7 Method for Notifying Position of pSF

In the afore-described methods G1) to G3), the position of PStart and/or PEnd may be pre-configured for the eNB and/or the UE by higher-layer signaling. If there is a UE expecting to be scheduled only in Full and PEnd, the UE may expect scheduling only at predetermined Full and PEnd positions.

4.7.8 Scheduling Restriction Method

If the eNB operates PEnd as in the proposed methods G2) and G3), scheduling restriction may be configured for a UE using a DM-RS-based TM.

For example, the eNB may not schedule PEnd for a self-scheduled UE for which an EPDCCH is configured or a UE for which a DM-RS-based TM is configured. Even though the eNB operates PEnd, the eNB may not transmit DM-RSs to the UE in PEnd.

More specifically, in the case where it may be indicated that an SF is PEnd by common signaling of a PCell to a UE for which a DM-RS-based TM is configured and by a PDCCH to a self-scheduled/cross-scheduled UE for which a PCIFCH or a PDCCH is configured, when a UE receives a scheduling grant for the SF, the UE may consider that the scheduling grant is not valid any longer.

Or the UE may interpret the validity of the scheduling grant differently according to the length of the SF. For example, if an SF has a length equal to or greater than X OFDM symbols and is PEnd, the UE may determine that a scheduling grant for the SF is valid. If the SF is PEnd shorter than X OFDM symbols, the UE may determine that the scheduling grant for the SF is not valid.

4.7.9 Method for Restricting CSI Configuration

Even when a self-scheduled UE for which an EPDCCH is configured receives a scheduling grant in an SF and CSI-RSs/CSI-IMs are configured in the SF, the UE may assume that there are no valid CSI-RSs/CSI-IMs in the SF. More specifically, even though the SF is PEnd and CSI-RSs/CSI-IMs are configured in the SF, the UE may measure CSI, assuming that the SF does not include valid CSI-RSs/CSI-IMs.

Or even though the SF is PEnd, a different UE operation may be defined according to the length of the SF. For example, if a CSI-RS/CSI-IM configuration is defined for application to PEnd, the UE may apply the CSI-RS/CSI-IM configuration to an SF determined to be PEnd.

These methods are applicable generally, not limited to a self-scheduled UE for which an EPDCCH is configured. For example, even though a UE recognizes the presence of CRSs or scheduling information in an SF, if the SF is PEnd (or PStart), the UE may assume that there are no valid CSI-RSs/CSI-IM in the SF, in spite of the presence of CSI-RSs/CSI-IM configured in the SF.

Or if a CSI-RS/CSI-IM configuration is defined for application to PEnd (or PStart), the UE may apply the CSI-RS/CSI-IM configuration to an SF determined to be PEnd (or PStart).

4.7.10 Method for Transmitting Reservation Signal

If the time of data transmission in an LAA SCell is restricted (e.g., to an SF boundary), there may be a timing gap between an LBT ending time (CCA or CS ending time) and an actual data transmission time. Particularly, since an eNB and a UE use an LAA SCell not exclusively but by contention, any other system may attempt to transmit information in the LAA SCell during the timing gap. Therefore, for example, the eNB preferably transmits a reservation signal to prevent another system from attempting to transmit information during the timing gap.

However, if the reservation signal is transmitted over a long period, the performance of the LTE system may be degraded and the reservation signal may interfere with a WiFi system, thereby degrading the performance of the WiFi system.

To solve the problem, a maximum value (i.e., Kms) may be set for transmission of a reservation signal in the system. For example, it may be set that K=1 ms (1 SF) or K=0.5 (1 slot). If a preamble including a PSS/SSS/CRS should be transmitted during a Z-OFDM symbol period (e.g., Z>=1) at the start of each DL TX burst for the purpose of AGC/fine synchronization/cell identification, the K time value may be set to include Z or without Z.

Further, to minimize SF waste during transmission of a continuous DL Tx burst, a TX gap may be preconfigured in some OFDM symbols of the last or first SF of the DL Tx burst. If an LBT operation can be completed during a Tx gap, waste of one whole SF may be avoided. In the case of a UCell, the eNB should perform the LBT operation again after a predetermined time of occupying the UCell. Therefore, the Tx gap may be set to a time value that ensures an LBT operation for the eNB to occupy a specific SF.

If the Tx gap is set to W OFDM symbols, the maximum transmission time period of a reservation signal may also be set to W OFDM symbols. If a preamble including a PSS/SSS/CRS should be transmitted during a Z-OFDM symbol period (e.g., Z>=1) at the start of each Tx burst, Z may or may not be included in W OFDM symbols.

If the Tx gap is variable in each Tx burst, the maximum value of a reservation signal may be equal to the size of the variable Tx gap or a maximum available value of the Tx gap. Herein, the maximum value of the reservation signal may also be set to a time that covers or does not cover a preamble.

The maximum value of the reservation signal may be restricted on UL as well as on DL in the same method, and the maximum value of the reservation signal may be set equally or independently on DL and UL.

On UL, the length of a reservation signal may not be related to setting of a Tx gap, and a reservation signal longer than 1 ms may also be allowed.

A time calculated by subtracting a minimum CS time taken for an LBT operation from the length of a reservation signal, Kms may be set as a maximum length of the reservation signal.

4.8 pSF for Transmission of Discovery RS (DRS)

pSFs proposed in Section 4.1 to Section 4.7 may be used as pSFs carrying DRSs as well as for a DL Tx burst including a PDSCH.

For example, if an available starting position of the DL burst (e.g., K OFDM symbols out of OFDM symbols transmitted in CRS antenna port 0) is preset, a pSF carrying DRSs may be configured to start only at the available starting position of the DL Tx burst.

Or the pSF carrying DRSs may be configured to start only at a part of positions at which the DL Tx burst may start.

Since embodiments of the foregoing proposed methods may be included as one of implementation methods of the present disclosure, it is obvious that they may be regarded as proposed methods. While the above-described proposed methods may be performed independently, some proposed methods may be combined (or merged). An eNB may provide information indicating whether the proposed methods are applied (or information about the rule of the proposed methods) to a UE by predefined signaling (e.g., physical-layer signaling or higher-layer signaling).

4.9 Embodiment in Case of Cross-Carrier Signaling

Figure 25:
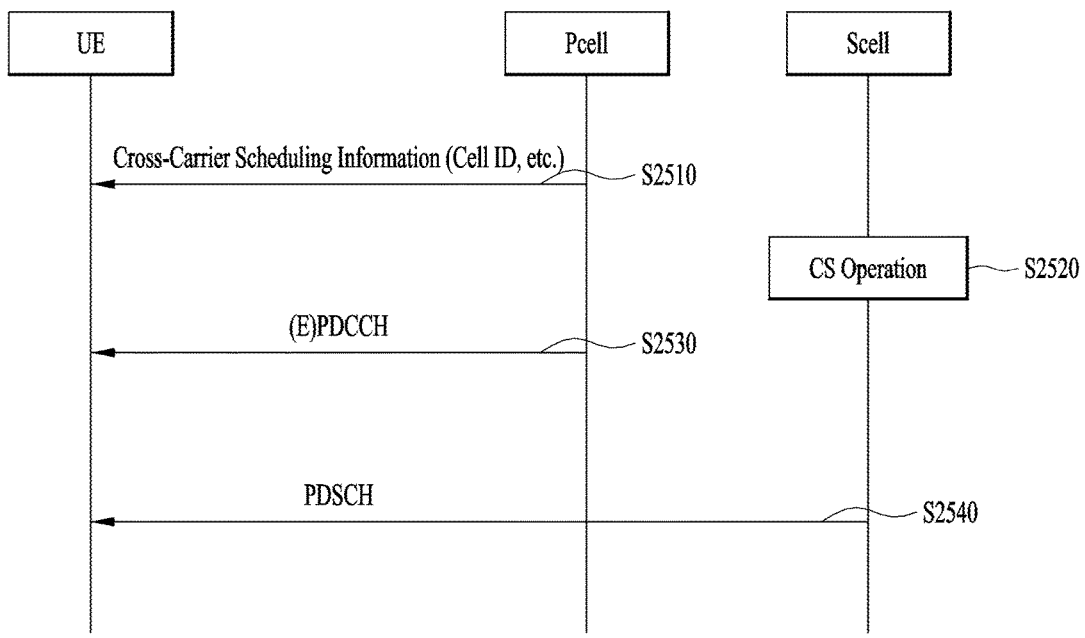
FIG. 25 is a diagram illustrating a signal flow for a method for restricting a subframe that a UE decodes, when cross-carrier scheduling is configured for the UE.

The following embodiment is intended to describe the method described in Section 4.1.5 in greater detail from the viewpoint of signaling between a UE and an eNB with reference to the attached drawings. FIG. 25 is a diagram illustrating a signal flow for a method for restricting an SF that a UE decodes, when cross-carrier scheduling is configured.

FIG. 25 is for an LAA system. A PCell is a cell configured in a licensed band of an LTE-A system or the like, whereas a UCell is a cell configured in an unlicensed band. Cross-carrier scheduling may be configured for a UE by higher-layer signaling in the PCell (S2510).

Herein, the UE may determine aggregated cells from cross-carrier scheduling information received in step S2510. The cross-carrier scheduling information may include a Cell ID identifying a UCell.

Subsequently, the eNB may determine whether the UCell is idle through a CS operation (an LBT or CCA operation) (S2520). In step S2520, steps S1410 to S1430 of FIG. 14 may be performed.

If the UCell is idle, the eNB may transmit to the UE a PDCCH and/or an EPDCCH carrying scheduling information required for data transmission to the UE in the UCell (S2530).

However, if the cross-carrier scheduling and pre-scheduling method among the methods described in Section 4.1 is configured for the UE, the UE and the eNB may not predict when the CCA operation (the CS or LBT operation) will be completed in the UCell. Therefore, even though a configured TxOP includes a pSF, the UE may not expect scheduling of a PDSCH in the pSF. For example, the UE may expect cross-carrier scheduling for a full SF or PEnd, not expecting scheduling of PStart only. That is, the UE may receive data, determining that a PDSCH is scheduled in a full SF and PEnd. Further, when cross-carrier scheduling is configured for the UE, the eNB may be configured not to schedule a PDSCH in a pSF (S2540).

If a PDSCH is not scheduled in the pSF in step S2540, the pSF may be used for synchronization, AGC setting, and/or cell identification.

4.10 Embodiment in Case of Self-Carrier Scheduling

Figure 26:
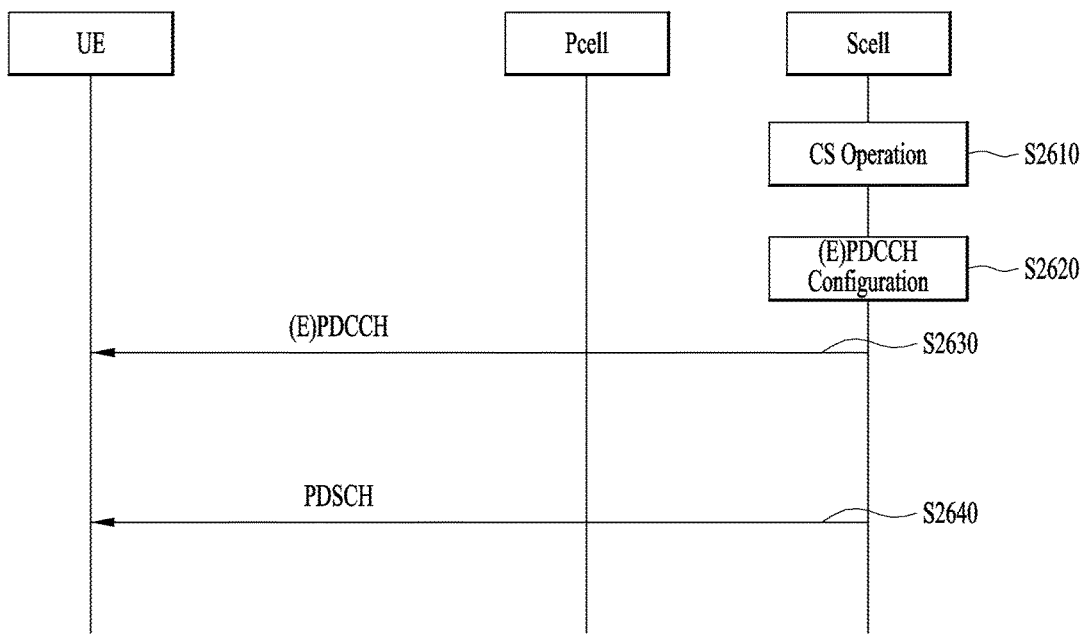
FIG. 26 is a diagram illustrating a signal flow for self-carrier scheduling described in Section 4.2 from the perspective of signaling between a UE and a BS.

FIG. 26 as described below is intended to describe the self-scheduling method of Section 4.2 from the viewpoint of signaling between a UE and an eNB.

The eNB may determine whether a UCell is idle by a CS operation. For details of the CS operation, refer to FIG. 14, and Section 3.1 to Section 3.3 (S2610).

If determining that the UCell is idle, the eNB may configure a PDCCH and/or an EPDCCH to be transmitted for self-scheduling. For methods of configuring a PDCCH and/or an EPDCCH, refer to Section 4.2.1 to Section 4.2.3.7. Particularly, if a TxOP (DL burst or RRP) includes a pSF, the eNB may configure and transmit the PDCCH in the method described in Section 4.2.1, and the EPDCCH in the method described in Section 4.2.3. In case of the EPDCCH, the ECCEs configuring the EPDCCH, the EREGs configuring single ECCE, and search spaces where the EPDCCH to be transmitted are configured in consideration of the pSF (S2620).

The UE may acquire control information by decoding a search space defined in the LAA system in order to receive the PDCCH and/or the EPDCCH.

Subsequently, the eNB may transmit the PDCCH and/or the EPDCCH to the UE to schedule each SF in the TxOP of the UCell, and transmit a PDSCH to the UE based on scheduling information included in the PDCCH and/or the EPDCCH (S2630 and S2640).

4.11 Methods for Measuring and Reporting CSI when pSF is Configured

Now, a description will be given of methods for measuring and reporting CSI when a pSF is configured for a UE.

Figure 27:
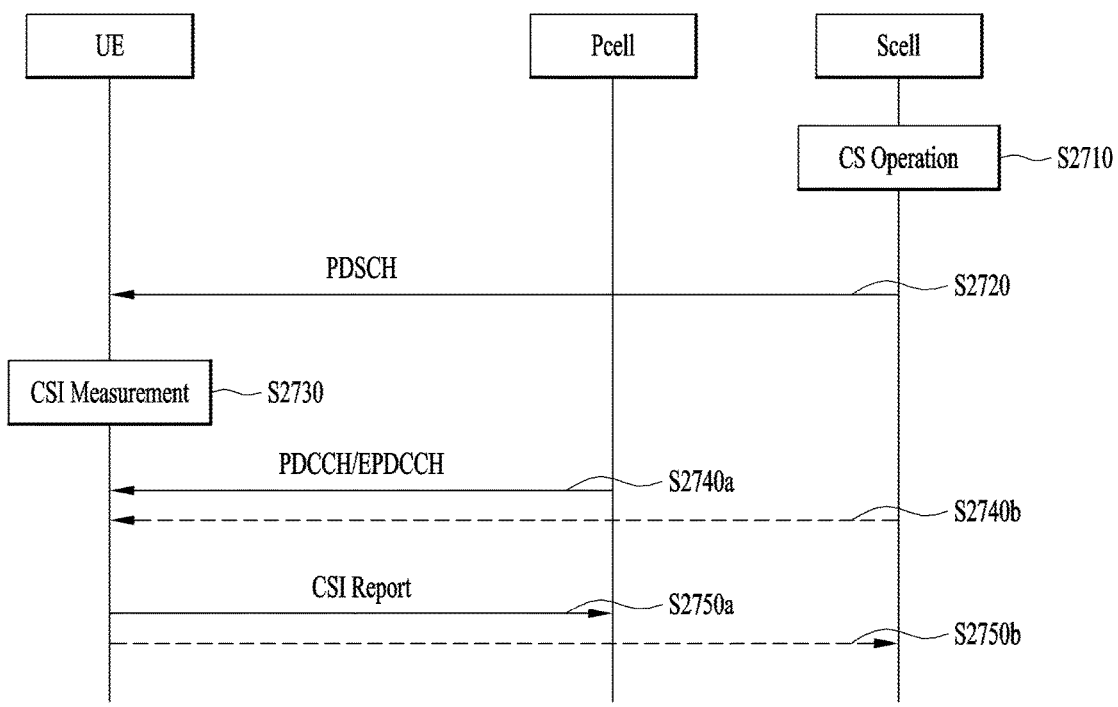
FIG. 27 is a diagram illustrating a signal flow for a method for measuring and reporting Channel State Information (CSI), when a pSF is configured.

FIG. 27 is a diagram illustrating a signal flow for a method for measuring and reporting CSI when a pSF is configured.

The following description is given basically based on the description of Section 4.4. Referring to FIG. 27, the eNB performs a CS operation in a UCell. If the UCell is idle, the eNB transmits PDSCHs to the UE during a TxOP or the like. For details, refer to FIG. 14 and Section 3.1 to Section 3.3 (S2710 and S2720).

The UE may measure CSI periodically or aperiodically. Herein, the UE may measure CSI based on CSI-RS resources, CSI-IM resources, and CRSs etc. mapped to the PDSCH transmitted in the UCell (S2730).

However, if the TxOP (RRP or DL burst) includes a pSF in step S2720, whether the pSF may be used as valid reference resources for CSI measurement in the UE in step S2730 may be an issue. In an embodiment of the present disclosure, when the UE measures CSI, the UE may not regard the pSF as a valid SF in order to overcome a pSF length mismatch between the UE and the eNB. For details, refer to Section 4.4.1.

In another aspect of the embodiment, the pSF may be regarded as a valid SF, for details of which, refer to Section 4.4.2.

If CSI is reported aperiodically, the UE should receive a related request from the eNB and thus step S2740a or S2740b is performed. That is, the eNB commands CSI reporting to the UE by transmitting a PDCCH and/or an EPDCCH including a CSI request field in the PCell and/or the UCell (S2740a or S2740b).

However, if the UE reports CSI periodically, step S2740a/b may not be performed.

The UE may measure CSI and report the CSI to the eNB periodically or aperiodically (S2750a or S2750b).

Steps S2740b and S2750b may be performed in the case of self-carrier scheduling, not in the case of cross-carrier scheduling.

5. Apparatuses

Figure 28:
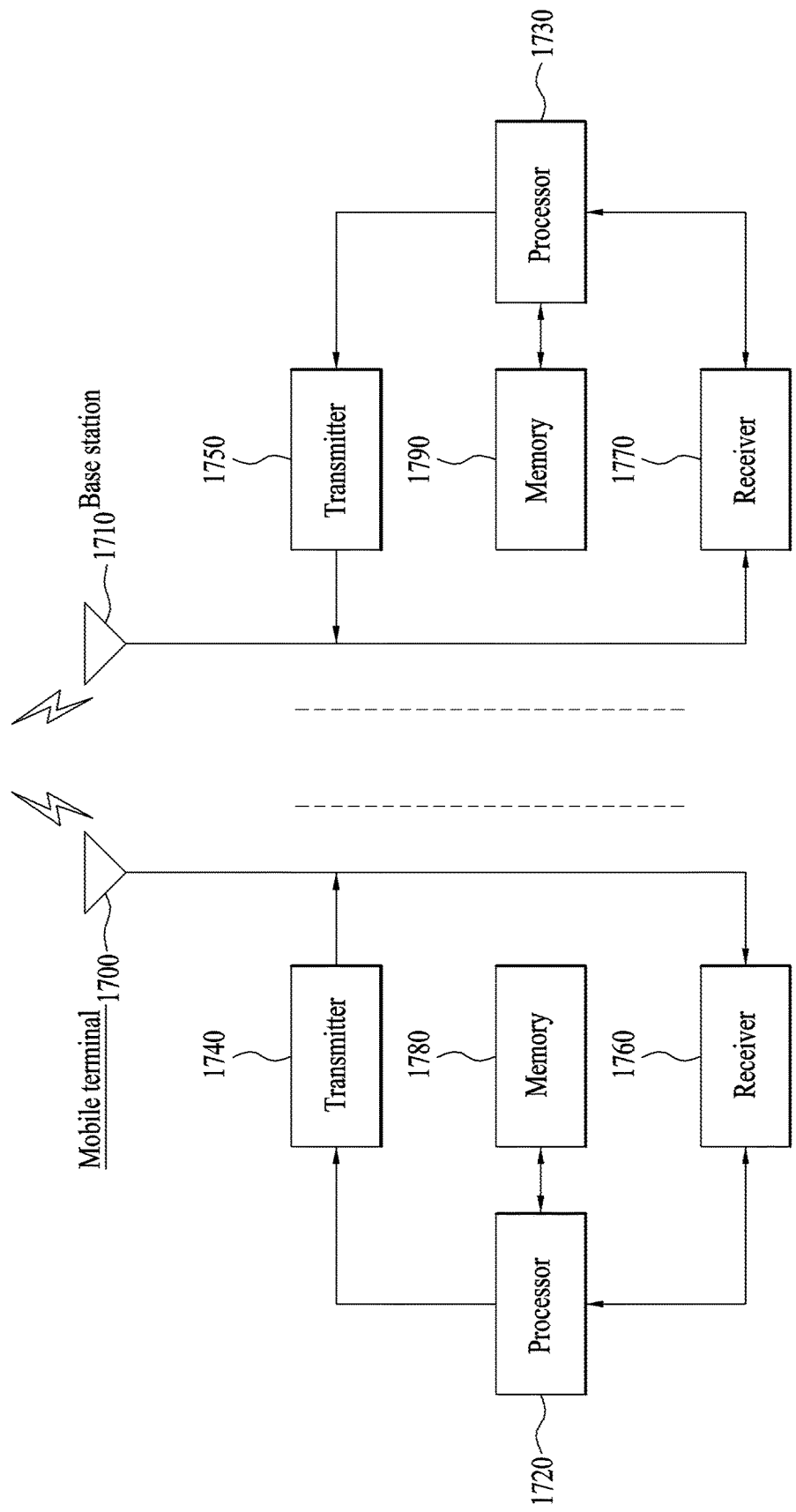
FIG. 28 is a block diagram of apparatuses for performing the methods described with reference to FIGS. 1 to 27.

Apparatuses illustrated in FIG. 28 are means that can implement the methods described before with reference to FIGS. 1 to 27.

A UE may act as a transmitter on a UL and as a receiver on a DL. An eNB may act as a receiver on a UL and as a transmitter on a DL.

That is, each of the UE and the eNB may include a transmitter 2840 or 2850 and a receiver 2860 or 2870, for controlling transmission and reception of information, data, and/or messages, and an antenna 2800 or 2810 for transmitting and receiving information, data, and/or messages.

Each of the UE and the eNB may further include a processor 2820 or 2830 for implementing the afore-described embodiments of the present disclosure and a memory 2880 or 2890 for temporarily or permanently storing operations of the processor 2820 or 2830.

The embodiments of the present disclosure may be performed using the afore-described components and function of a UE and an eNB. For example, a processor of the eNB may set a backoff count and determine in each TTI (or SF) whether a backoff operation is allowed in the TTI (or SF). If the backoff operation is allowed in the TTI (or SF), the processor may perform a CS operation by controlling a transmitter and/or a receiver. When performing the CS operation, the processor may decrement the backoff count by 1. If the backoff count becomes 0, the processor of the eNB may transmit or receive a reservation signal and/or data to or from the UE in a UCell.

Further, the afore-described processors of the UE and the eNB may be configured to support the afore-described cross-carrier scheduling, self-carrier scheduling, hybrid scheduling, methods for measuring CSI in a pSF, methods for configuring a floating TTI, method for configuring a PDCCH region and an EPDCCH region, and operations for them. For the purpose, the processors of the UE and the eNB may be operatively connected to the transmitters and the receivers and control the transmitters and the receivers.

The transmitters and the receivers of the UE and the eNB may perform a packet modulation/demodulation function for data transmission, a high-speed packet channel coding function, OFDMA packet scheduling, TDD packet scheduling, and/or channelization. Each of the UE and the eNB of FIG. 28 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2880 or 2890 and executed by the processor 2820 or 2830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for reporting channel state information (CSI) by a user equipment (UE) in a wireless access system supporting an unlicensed band, the method comprising:
   receiving a predetermined number of subframes of a downlink burst configured in an unlicensed band cell (UCell) supporting the unlicensed band;
   measuring CSI for the downlink burst; and
   reporting the measured CSI to a base station (BS),
   wherein the downlink burst includes a partial subframe (pSF) configured in a size smaller than a normal subframe, and
   wherein the pSF is not considered to be a valid downlink subframe for measuring the CSI.

2. The method according to claim 1, wherein the pSF is scheduled by self-carrier scheduling, and a normal subframe included in the downlink burst is scheduled by cross-carrier scheduling.

3. The method according to claim 1, wherein reporting the CSI in a primacy cell (PCell) configured in a licensed band is requested by the BS, and the measured CSI is reported in the PCell.

4. The method according to claim 1, wherein reporting the CSI in the UCell is requested by the BS, and the measured CSI is reported in the UCell.

5. The method according to claim 1, wherein the CSI is periodically reported in a PCell configured in a licensed band.

6. The method according to claim 1,
   wherein a reference resource for measuring the CSI is not allocated to the pSF, and
   wherein the measuring the CSI comprises measuring the CSI only in a normal subframe included in the downlink burst.

7. A user equipment (UE) for reporting channel state information (CSI) in a wireless access system supporting an unlicensed band, the UE comprising:
   a receiver;
   a transmitter; and
   a processor configured to support CSI measurement,
   wherein the processor is configured to:
      control the receiver to receive a predetermined number of subframes of a downlink burst configured in an unlicensed band cell (UCell) supporting the unlicensed band;
      measure CSI for the downlink burst; and
      control the transmitter to report the measured CSI to a base station (BS),
   wherein the downlink burst includes a partial subframe (pSF) configured in a size smaller than a normal subframe, and
   wherein the pSF is not considered to be a valid downlink subframe for measuring the CSI.

8. The UE according to claim 7, wherein reporting the CSI reporting in a primacy cell (PCell) configured in a licensed band is requested by the BS, and the measured CSI is reported in the PCell.

9. The UE according to claim 7, wherein reporting the CSI in the UCell is requested by the BS, and the measured CSI is reported in the UCell.

10. The UE according to claim 7, wherein the CSI reported periodically in a PCell configured in a licensed band.

11. The UE according to claim 7,
    wherein a reference resource for CSI measurement is not allocated to the pSF, and
    wherein the processor is configured to measure the CSI only in a normal subframe included in the downlink burst.

12. The UE according to claim 7, wherein the pSF is scheduled by self-carrier scheduling, and a normal subframe included in the downlink burst is scheduled by cross-carrier scheduling.

* * * * *